(12) United States Patent
Meeks et al.

(10) Patent No.: US 7,997,439 B2
(45) Date of Patent: Aug. 16, 2011

(54) FLEXIBLE BAKEWARE HAVING A MULTI-PIECE CARRIER SYSTEM

(75) Inventors: Steve Meeks, Mineral Wells, TX (US); Russell T. DeBlassie, Weatherford, TX (US); Jeannie Holmes, Weatherford, TX (US); Samuel W. Heath, Jr., Fort Worth, TX (US)

(73) Assignee: Jamak Fabrication-Tex, LLC, Weatherford, TX (US)

( * ) Notice: Subject to any disclaimer, the term of this patent is extended or adjusted under 35 U.S.C. 154(b) by 521 days.

(21) Appl. No.: 11/025,125

(22) Filed: Dec. 29, 2004

(65) Prior Publication Data

US 2005/0199132 A1    Sep. 15, 2005

Related U.S. Application Data

(63) Continuation-in-part of application No. 10/685,052, filed on Oct. 14, 2003, now Pat. No. 7,282,532.

(60) Provisional application No. 60/476,325, filed on Jun. 6, 2003.

(51) Int. Cl.
*A47J 27/00* (2006.01)
*B65D 30/00* (2006.01)
*B65D 25/00* (2006.01)

(52) U.S. Cl. .............. 220/573.2; 220/9.1; 220/9.4

(58) Field of Classification Search ........... 220/573.2, 220/410, 495.01, 9.1, 9.4, 912; 249/92, 93
See application file for complete search history.

(56) References Cited

U.S. PATENT DOCUMENTS

| | | | |
|---|---|---|---|
| 776,777 A | 12/1904 | Dietz | |
| 1,965,647 A | 7/1934 | Jackson | |
| 2,182,454 A | * 12/1939 | Sherman | 62/345 |
| 2,506,928 A | 5/1950 | Klingbiel | |
| 2,774,509 A | 12/1956 | Knobloch | |
| 3,296,153 A | 1/1967 | Snogren | |
| 3,419,593 A | 12/1968 | Willing | |
| 3,475,332 A | 10/1969 | Leeper et al. | |
| 3,638,583 A | 2/1972 | Goodier et al. | |
| 3,659,557 A | 5/1972 | Noorlander | |
| 3,669,606 A | 6/1972 | Brown | |
| 3,715,047 A | 2/1973 | Sado | |
| 3,715,329 A | 2/1973 | Glaister | |
| 3,771,494 A | 11/1973 | Mills | |

(Continued)

FOREIGN PATENT DOCUMENTS

AU     659437     8/1992

(Continued)

OTHER PUBLICATIONS

Partial International Search dated May 26, 2006 for International Application No. PCT/US2005/047455 filed Dec. 28, 2005.

(Continued)

*Primary Examiner* — Anthony Stashick
*Assistant Examiner* — Shawn M Braden
(74) *Attorney, Agent, or Firm* — SNR Denton US LLP

(57) ABSTRACT

A flexible bakeware compound includes a flexible baking container having a basin and a first carrier member disposed in an upper portion of the basin. A second carrier member is also disposed in the upper portion of the basin such that the second carrier member is capable of movement relative to the first carrier member.

11 Claims, 17 Drawing Sheets

U.S. PATENT DOCUMENTS

| | | | |
|---|---|---|---|
| 3,814,731 A | 6/1974 | Nitzche et al. | |
| 3,900,617 A | 8/1975 | Grenoble | |
| 3,919,161 A | 11/1975 | Glaister | |
| 3,972,850 A | 8/1976 | Hamilton et al. | |
| 3,981,656 A * | 9/1976 | Steels et al. | 425/182 |
| 3,984,022 A | 10/1976 | Babiol | |
| 4,002,773 A | 1/1977 | Entenmann | |
| 4,028,339 A | 6/1977 | Merrill | |
| 4,031,059 A | 6/1977 | Strauss | |
| 4,042,543 A | 8/1977 | Strickman et al. | |
| 4,076,207 A * | 2/1978 | Austin | 249/66.1 |
| 4,141,319 A | 2/1979 | Maier et al. | |
| 4,165,061 A * | 8/1979 | Kupperman et al. | 249/92 |
| 4,183,998 A | 1/1980 | Vassiliou | |
| 4,200,658 A | 4/1980 | Katzman et al. | |
| 4,216,241 A | 8/1980 | Thompson | |
| 4,223,069 A | 9/1980 | Berghmans | |
| 4,280,446 A | 7/1981 | Noorlander | |
| 4,363,849 A | 12/1982 | Paisley et al. | |
| 4,425,872 A | 1/1984 | Mills | |
| 4,452,859 A | 6/1984 | Nishijima et al. | |
| 4,459,247 A | 7/1984 | Rothemund | |
| 4,459,939 A | 7/1984 | Noorlander | |
| 4,463,029 A | 7/1984 | Nishijima et al. | |
| 4,473,919 A | 10/1984 | Fritz, Jr. | |
| 4,477,517 A | 10/1984 | Rummel | |
| 4,529,741 A | 7/1985 | Bauman et al. | |
| 4,530,307 A | 7/1985 | Thompson | |
| 4,585,705 A | 4/1986 | Broderick et al. | |
| 4,585,848 A | 4/1986 | Evans et al. | |
| 4,610,220 A | 9/1986 | Goldberg et al. | |
| 4,623,565 A | 11/1986 | Huybrechts et al. | |
| 4,640,951 A | 2/1987 | Skostins | |
| 4,647,641 A | 3/1987 | Westbrook | |
| 4,651,676 A | 3/1987 | Kupres | |
| 4,731,517 A | 3/1988 | Cheney | |
| 4,812,115 A | 3/1989 | Kemp | |
| 4,826,029 A | 5/1989 | Skoglie | |
| 4,852,204 A | 8/1989 | Wilson | |
| 4,869,205 A | 9/1989 | Larson | |
| 4,895,766 A | 1/1990 | Saad | |
| 4,923,755 A | 5/1990 | Witucki | |
| 4,929,460 A | 5/1990 | Lagarde et al. | |
| 4,964,368 A | 10/1990 | Ball et al. | |
| 4,981,637 A | 1/1991 | Hyer | |
| 4,986,432 A | 1/1991 | Anghileri | |
| 5,007,378 A | 4/1991 | Larson | |
| 5,069,162 A | 12/1991 | Thompson et al. | |
| 5,071,695 A | 12/1991 | Tannenbaum | |
| 5,107,563 A | 4/1992 | Zimmerman et al. | |
| 5,162,397 A | 11/1992 | Descamps et al. | |
| 5,206,329 A | 4/1993 | Sumpter et al. | |
| 5,217,631 A | 6/1993 | Anghileri | |
| 5,232,959 A | 8/1993 | Togashi et al. | |
| 5,246,982 A | 9/1993 | Inoue et al. | |
| 5,252,685 A | 10/1993 | Arai et al. | |
| 5,283,927 A | 2/1994 | Gibbon et al. | |
| 5,317,047 A | 5/1994 | Sabate et al. | |
| 5,317,988 A | 6/1994 | Hoefelmayr et al. | |
| 5,349,718 A | 9/1994 | Gibbon | |
| D356,716 S | 3/1995 | Dornbush et al. | |
| 5,400,128 A | 3/1995 | Michlin | |
| 5,400,698 A | 3/1995 | Savage | |
| 5,428,097 A | 6/1995 | Kobayashi | |
| 5,478,605 A | 12/1995 | Ichise | |
| 5,480,915 A | 1/1996 | Burns | |
| 5,491,869 A | 2/1996 | Sullivan et al. | |
| 5,496,862 A | 3/1996 | Burns | |
| 5,521,245 A | 5/1996 | Hirabayashi et al. | |
| 5,623,028 A | 4/1997 | Fitzgerald et al. | |
| 5,641,831 A | 6/1997 | Hamilton | |
| 5,652,287 A | 7/1997 | Sullivan et al. | |
| 5,666,904 A | 9/1997 | Grindal | |
| 5,691,067 A | 11/1997 | Patel | |
| 5,692,629 A | 12/1997 | Burns | |
| 5,716,699 A | 2/1998 | Reo | |
| 5,767,185 A | 6/1998 | Reo | |
| D400,402 S | 11/1998 | Petkovich, Jr. | |
| 5,867,867 A | 2/1999 | Kessler | |
| 5,929,143 A | 7/1999 | Ward et al. | |
| 5,932,649 A | 8/1999 | Hergenrother et al. | |
| 5,955,149 A | 9/1999 | Kuziemka | |
| 5,981,610 A | 11/1999 | Meguriya et al. | |
| 5,997,627 A | 12/1999 | Babler | |
| 6,004,496 A | 12/1999 | Reo | |
| 6,022,816 A | 2/2000 | Dewar | |
| 6,077,592 A | 6/2000 | Azuma et al. | |
| 6,085,923 A | 7/2000 | Yaniger | |
| 6,146,673 A | 11/2000 | Ferguson | |
| 6,153,275 A | 11/2000 | Yaniger | |
| 6,197,359 B1 | 3/2001 | Hompanera | |
| 6,221,451 B1 | 4/2001 | Lauer et al. | |
| 6,245,431 B1 | 6/2001 | Griswold et al. | |
| 6,339,124 B1 | 1/2002 | Igarashi et al. | |
| 6,348,243 B1 | 2/2002 | Fuller et al. | |
| 6,427,624 B1 | 8/2002 | Briggs et al. | |
| 6,435,132 B1 | 8/2002 | Milbrath et al. | |
| 6,506,331 B2 | 1/2003 | Meguriya | |
| 6,528,152 B1 | 3/2003 | Piriwe | |
| 6,552,096 B2 | 4/2003 | Meguriya | |
| 6,613,406 B1 | 9/2003 | Yaniger | |
| 6,616,997 B1 | 9/2003 | Lauer et al. | |
| 6,750,279 B1 | 6/2004 | Wang | |
| 6,797,223 B2 * | 9/2004 | Beale et al. | 264/337 |
| 6,857,389 B2 | 2/2005 | Miller | |
| 6,976,597 B2 * | 12/2005 | Jahrling et al. | 211/175 |
| 7,028,367 B2 | 4/2006 | Sharabura et al. | |
| 7,150,221 B2 | 12/2006 | Morgan | |
| 7,282,532 B2 | 10/2007 | Holmes et al. | |
| 7,373,687 B2 | 5/2008 | Sharabura et al. | |
| 7,517,933 B2 | 4/2009 | Holmes | |
| 7,703,167 B2 | 4/2010 | Sharabura et al. | |
| 2001/0043977 A1 | 11/2001 | Hompanera | |
| 2002/0103275 A1 | 8/2002 | Nogueria de Sousa | |
| 2002/0110627 A1 | 8/2002 | Hirano | |
| 2002/0171027 A1 * | 11/2002 | Martellato et al. | 249/160 |
| 2003/0047838 A1 | 3/2003 | Beale et al. | |
| 2003/0071188 A1 * | 4/2003 | Bruno | 249/134 |
| 2003/0161985 A1 | 8/2003 | Lauer | |
| 2003/0165683 A1 | 9/2003 | Sharabura et al. | |
| 2003/0192847 A1 * | 10/2003 | Jahrling et al. | 211/175 |
| 2003/0229961 A1 | 12/2003 | Barnett | |
| 2004/0096558 A1 | 5/2004 | Meroni | |
| 2004/0249059 A1 | 12/2004 | Akbar et al. | |
| 2005/0165138 A1 | 7/2005 | Holmes et al. | |
| 2005/0193899 A1 | 9/2005 | DeBlassie et al. | |
| 2005/0199131 A1 | 9/2005 | Meeks et al. | |
| 2005/0247212 A1 | 11/2005 | Meeks et al. | |
| 2007/0017449 A1 | 1/2007 | Holmes et al. | |
| 2007/0203266 A1 | 8/2007 | Holmes et al. | |
| 2008/0263811 A1 | 10/2008 | Sharabura et al. | |

FOREIGN PATENT DOCUMENTS

| | | |
|---|---|---|
| AU | 691497 | 11/1994 |
| AU | 734250 | 2/1999 |
| AU | 721157 | 12/1999 |
| AU | 730928 | 4/2000 |
| AU | 783552 | 6/2001 |
| AU | 2001/290763 | 3/2002 |
| AU | 749676 | 5/2002 |
| CA | 1 177 600 | 10/1981 |
| DE | 102 58 345 A1 | 6/2004 |
| EP | 0 105 206 | 4/1984 |
| EP | 0 043 264 | 4/1985 |
| EP | 0 282 661 | 9/1988 |
| EP | 0 346 887 | 12/1989 |
| EP | 0 457 993 | 11/1991 |
| EP | 0 259 459 | 12/1991 |
| EP | 0 496 194 | 7/1992 |
| EP | 0 507 481 | 10/1992 |
| EP | 0220898 | 10/1993 |
| EP | 0577357 | 1/1994 |
| EP | 0 657 331 | 6/1995 |
| EP | 0 773 090 | 5/1997 |
| EP | 0 935 916 | 8/1999 |
| EP | 0 992 195 A1 | 4/2000 |
| EP | 0992195 | 4/2000 |

| | | |
|---|---|---|
| EP | 1034907 | 9/2000 |
| EP | 1 088 855 | 4/2001 |
| EP | 1 197 149 A2 | 4/2002 |
| EP | 1197149 | 4/2002 |
| EP | 1233014 | 8/2002 |
| FR | 1 518 450 | 4/1967 |
| FR | 2658034 | 8/1991 |
| FR | 2710001 | 3/1995 |
| FR | 2715407 | 7/1995 |
| FR | 2747885 | 10/1997 |
| FR | 2747886 | 10/1997 |
| GB | 1 207 674 | 10/1970 |
| GB | 1 536 051 | 12/1978 |
| GB | 2 119 620 | 11/1983 |
| JP | 60025831 | 8/1985 |
| JP | 64-57710 | 3/1989 |
| JP | 2-077346 | 3/1990 |
| JP | 05-117530 | 5/1993 |
| JP | 06-262943 | 9/1994 |
| JP | 09-109365 | 4/1997 |
| JP | 09-136959 | 5/1997 |
| JP | 09-296136 | 11/1997 |
| JP | 10-7903 | 1/1998 |
| JP | 10001640 | 1/1998 |
| JP | 2000-160019 | 6/2000 |
| SI | 20738 | 6/2002 |
| WO | WO-80/01559 | 8/1980 |
| WO | WO-99/34685 | 7/1999 |
| WO | WO-99/40794 | 8/1999 |
| WO | WO-03/004367 A1 | 1/2003 |
| WO | WO-03/020817 A1 | 3/2003 |
| WO | WO-03/029130 A1 | 4/2003 |

OTHER PUBLICATIONS

Author Unknown; Denmarle Flexipan Information Sheet; Date Unknown; www.demarleusa.com; pp. 1-3.

Tefal Company website; "Proflex"; www.tefal.co.uk; publication date unknown; 2 pages.

Affidavit of Jeannie Holmes; executed Nov. 2, 2004; 1 page.

PCT International Search Report for International Application No. PCT/US2004/017697 dated Dec. 8, 2004.

PCT International Search Report and Written Opinion dated May 23, 2005; PCT International Application No. PCT/US2005/02028.

PCT International Search Report and Written Opinion dated Mar. 27, 2003; PCT International Application No. PCT/US02/39430.

PCT International Search Report for International Application No. PCT/US2005/047455 dated Aug. 18, 2006.

PCT International Search Report and Written Opinion dated Oct. 2, 2007 for PCT International Application No. PCT/US06/27582.

PCT International Search Report and Written Opinion of the International Searching Authority or the Declaration mailed on Mar. 17, 2008 in PCT International Application No. PCT/US07/23734.

Ausimont; Algoflon Properties and Applications Selection Guide, Jul. 1999, 8 pages.

Abstract of European Patent No. 00657331; European Patent App. No. 93119903, entitled Method of Producing Wiper Blade Rubber and Wiper Blade Rubber Produced Therby, published Apr. 7, 1999, see pp. 3-4 of nerac.com Retro Search.

Abstract of European Patent No. EP 00259459; European Patent App. No. 87901997, entitled Powder Atomizing Methods and Apparatus, published Dec. 27, 1991, see pp. 4-6 of nerac.com Retro Search.

Abstract of Japanese Publication No. 10007903; Japanese Patent App. No. 08169727, entitled Aliphatic Nylon Solution and Wiper Blade Coated Therewith, published Jan. 13, 1998, see pp. 6-7 of nerac.com Retro Search.

Abstract of Japanese Publication No. 10001640; Japanese Patent App. No. 08172837, entitled Coating Composition for Wiper Blade Rubber, published Jan. 6, 1998, see p. 7 of nerac.com Retro Search.

Abstract of Japanese Publication No. 09296136; Japanese Patent App. No. 08146423, entitled Coating Composition for Repairing Wiper Blade Rubber, published Nov. 18, 1997, see pp. 7-8 of nerac.com Retro Search.

Abstract of Japanese Publication No. 09136959; Japanese Patent App. No. 07298266, entitled Wiper Blade, published May 27, 1997, see p. 8 of nerac.com Retro Search.

Abstract of Japanese Publication No. 09109365; Japanese Patent App. No. 07267191, entitled Solder Paste Printing Squeegee, published Apr. 28, 1997, see pp. 8-9 of nerac.com Retro Search.

Abstract of US Patent No. 6,004,496 US Patent App. No. 837891, entitled Method of Making a Silicone rubber Windshield Wiper, Dec. 21, 1999, see pp. 9-10 of nerac.com Retro Search.

Abstract of US Patent No. 5,767,185; US Patent App. No. 837754, entitled Moldable and Tintable Silicone Rubber Composition for Windshield Wiper Blade, Jun. 16, 1998, see p. 10 of nerac.com Retro Search.

Abstract of US Patent No. 5,716,699; US Patent App. No. 603920, entitled Silicone Rubber Windshield Wiper Blade, Feb. 10, 1998, see pp. 10-11 of nerac.com Retro Search.

Abstract of US Patent No. 5,478,605; US Patent App. No. 358567, entitled Method of Producing Rubber Wiper Blades, Dec. 26, 1995, see pp. 11-12 of nerac.com Retro Search.

Abstract of US Patent No. 5,400,128; US Patent App. No. 101016, entitled Wiper and Spreader Blades with Conductive Coating, Mar. 21, 1995, see p. 12 of nerac.com Retro Search.

Abstract of US Patent No. 5,107,563; US Patent App. No. 584539, entitled Non Stick Windshield Wipers, Apr. 28, 1992, see p. 13 of nerac.com Retro Search.

Abstract of US Patent No. 4,852,204; US Patent App. No. 112531, entitled Windshield Wiper Structure, Aug. 1, 1989, see pp. 13-14 of nerac.com Retro Search.

Abstract of US Patent No. 4,731,517; US Patent App. No. 839284, entitled Powder Atomizing Methods and Apparatus, Mar. 15, 1988, see pp. 14-15 of nerac.com Retro Search.

Abstract of Japanese Publication No. 06262943; Japanese Patent App. No. 05050875, entitled Window Shield System for Automobile, published Sep. 20, 1994, see pp. 15-16 of nerac.com Retro Search.

Abstract of Japanese Publication No. 05117530; Japanese Patent App. No. 03311899, entitled Silicon Rubber Composition for Wiper Blade, published May 14, 1993, see p. 16 of nerac.com Retro Search.

Abstract of Japanese Publication No. 02077346; Japanese Patent App. No. 63229588, entitled Wiper Blade, published Mar. 16, 1990, see pp. 16-17 of nerac.com Retro Search.

Abstract of Japanese Publication No. 01057710; Patent App. No. 62215594, entitled Manufacture of Chip Type Solid Electrolytic Capacitor, published Mar. 6, 1989, see p. 17 of nerac.com Retro Search.

Abstract of Japanese Publication No. 60025831; Patent App. No. 58134257, entitled Windshield Wiper for Automobile, published Feb. 8, 1985, see pp. 17-18 of nerac.com Retro Search.

Abstract of Japanese Patent App. No. 10-3380003, Publication No. 2000-160019, entitled Silicone Rubber Composition for Wiper Blade, published Jun. 13, 2000.

Abstract of Japanese Patent App. No. 03-311899, Publication No. 05-117530, entitled Silicone Rubber Composition for Wiper Blade, published May 14, 1993.

Restriction Requirement dated Sep. 27, 2004 for U.S. Appl. No. 10/685,052.

Response to Restriction Requirement filed Oct. 27, 2004 to Restriction Requirement dated Sep. 27, 2004 for U.S. Appl. No. 10/685,052.

Response to Restriction Requirement filed Mar. 2, 2005 to Restriction Requirement dated Sep. 27, 2004 in U.S. Appl. No. 10/685,052.

Non-Final Office Action dated Jun. 17, 2005 for U.S. Appl. No. 10/685,052.

Response filed Nov. 17, 2005 to Non-Final Office Action dated Jun. 17, 2005 for U.S. Appl. No. 10/685,052.

Final Office Action dated Jan. 25, 2006 for U.S. Appl. No. 10/685,052.

Response filed Apr. 25, 2006 to Final Office Action dated Jan. 25, 2006 for U.S. Appl. No. 10/685,052.

Notice of Non-compliant Amendment dated May 9, 2006 for U.S. Appl. No. 10/685,052.

Response filed May 15, 2006 to Notice of Non-compliant Amendment dated May 9, 2006 for U.S. Appl. No. 10/685,052.

Non-Final Office Action dated Jun. 30, 2006 for U.S. Appl. No. 10/685,052.

Response filed Oct. 2, 2006 to Non-Final Office Action dated Jun. 30, 2006 for U.S. Appl. No. 10/685,052.
Notice of Allowability dated Feb. 2, 2007 for U.S. Appl. No. 10/685,052.
Amendment to Notice of Allowability May 2, 2007 for U.S. Appl. No. 10/685,052.
Rule 312 Communication dated Jun. 18, 2007 for U.S. Appl. No. 10/685,052.
Non-final Office Action dated Oct. 11, 2007 for U.S. Appl. No. 11/025,175.
Notice of Abandonment dated May 13, 2008 for U.S. Appl. No. 11/025,175.
Non-final Office Action dated Oct. 11, 2007 for U.S. Appl. No. 11/025 108.
Response to first Office Action filed Apr. 11, 2008 for U.S. Appl. No. 11/025,108.
Final Office Action dated Jul. 3, 2008 for U.S. Appl. No. 11/025,108.
Notice of Abandonment dated Mar. 4, 2009 for U.S. Appl. No. 11/025,108.
Non-final Office Action dated Oct. 3, 2007 for U.S. Appl. No. 11/025,038.
Response to Non-final Office Action filed Apr. 7, 2008 for U.S. Appl. No. 11/025,038.
Final Office Action dated Jul. 1, 2008 for U.S. Appl. No. 11/025,038.
RCE/Response to Final Office Action filed Dec. 1, 2008 for U.S. Appl. No. 11/025,038.
Final Office Action dated Feb. 11, 2009 for U.S. Appl. No. 11/025,038.
Rce/Response filed Jul. 13, 2009 to Final Office Action dated Feb. 11, 2009 for U.S. Appl. No. 11/025,038.
Non-Final Action dated Sep. 3, 2009 issued in U.S. Appl. No. 11/025,038.
Response filed Jan. 4, 2010 to Non-Final Action dated Sep. 3, 2009 in U.S. Appl. No. 11/025,038.
Final Rejection date mailed Apr. 14, 2010 in U.S. Appl. No. 11/025,038.
Response filed Jan. 4, 2010 to Non-Final Action dated Sep. 3, 2009 in U.S. Appl. No. 11/025,038.
Non-Final Office Action dated May 28, 2008 for U.S. Appl. No. 11/810,369.
Examiner Interview Summary dated Sep. 9, 2008 in U.S. Appl. No. 11/810,369.
Response and Terminal Disclaimers to Non-Final Office Action filed Sep. 26, 2008 for U.S. Appl. No. 11/810,369.
Notice of Allowance, Interview Summary and Acceptance of Terminal of Disclaimers dated Dec. 3, 2008 in U.S. Appl. No. 11/810,369.
Non-final Office Action dated Nov. 12, 2004 for U.S. Appl. No. 10/764,094.
Response filed Feb. 18, 2005 for U.S. Appl. No. 10/764,094.
Non-final Office Action dated Jun. 21, 2005 for U.S. Appl. No. 10/764,094.
Response filed Sep. 21, 2005 for U.S. Appl. No. 10/764,094.
Non-final Office Action dated Dec. 6, 2005 for U.S. Appl. No. 10/764,094.
Response filed Apr. 7, 2006 for U.S. Appl. No. 10/764,094.
Examiner Interview Summary and Final Office Action dated May 24, 2006 for U.S. Appl. No. 10/764,094.
Response dated Oct. 2, 2006 to Final Action dated May 24, 2006 for U.S. Appl. No. 10/764,094.
Advisory Action dated Oct. 23, 2006 for U.S. Appl. No. 10/764,094.
RCE/Amendment filed Nov. 27, 2006 for U.S. Appl. No. 10/764,094.
Non-Final Office Action dated Feb. 27, 2007 for U.S. Appl. No. 10/764,094.
Response filed Aug. 6, 2007 to Feb. 27, 2007 Non-Final Action for U.S. Appl. No. 10/764,094.
Final Office Action dated Sep. 18, 2007 for U.S. Appl. No. 10/764,094.
RCE/Response filed Mar. 18, 2008 for U.S. Appl. No. 10/764,094.
Non-Final Office Action dated Apr. 7, 2008 for U.S. Appl. No. 10/764,094.
Response to Non-Final Office Action filed Oct. 7, 2008 for U.S. Appl. No. 10/764,094.
Final Office Action Dec. 17, 2008 for U.S. Appl. No. 10/764,094.
RCE/Response filed Jun. 17, 2009 to Final Office Action dated Dec. 17, 2008 for U.S. Appl. No. 10/764,094.
Non-Final Action date mailed Aug. 3, 2009 in U.S. Appl. No. 10/764,094.
Notice of Abandonment date mailed Feb. 18, 2010 in U.S. Appl. No. 10/764,094.
Non-Final Action dated Aug. 26, 2009 in U.S. Appl. No. 11/598,553.
Notice of Abandonment date mailed Mar. 17, 2010 in U.S. Appl. No. 11/598,553.
Notice of Allowance and Examiner Interview Summary dated Oct. 21, 2005 issued in U.S. Appl. No. 10/313,346.
Amendment After Notice of Allowance filed Jan. 20, 2006 in U.S. Appl. No. 10/313,346.
Communication re 312 Amendment issued on Mar. 2, 2006 issued in U.S. Appl. No. 10/313,346.
Non-final Office Action dated Jul. 23, 2007 for U.S. Appl. No. 11/358,525.
Response and Terminal Disclaimer filed Oct. 29, 2007 in U.S. Appl. No. 11/358,525.
Terminal Disclaimer filed Dec. 26, 2007 in U.S. Appl. No. 11/358,525.
Notice of Allowance dated Apr. 16, 2008 for U.S. Appl. No. 11/358,525.
Non-Final Office Action dated Apr. 13, 2009 for U.S. Appl. No. 12/123,306.
Response filed Sep. 14, 2009 to Non-Final Action dated Apr. 13, 2009 in U.S. Appl. No. 12/123,306.
Notice of Allowance/Allowability and Examiner Interview Summary date mailed Jan. 15, 2010 in U.S. Appl. No. 12/123,306.
Restriction Requirement dated Mar. 27, 2008 for U.S. Appl. No. 11/260,344.
Response filed Jun. 26, 2008 to Restriction Requirement dated Mar. 27, 2008 for U.S. Appl. No. 11/260,344.
Restriction Requirement dated Aug. 8, 2008 for U.S. Appl. No. 11/260,344.
Response filed Sep. 8, 2008 to Restriction Requirement dated Aug. 8, 2008 for U.S. Appl. No. 11/260,344.
Non-Final Office Action dated Nov. 10, 2008 for U.S. Appl. No. 11/260,344.
Response filed May 11, 2009 to Non-Final Office Action dated Nov. 10, 2008 for U.S. Appl. No. 11/260,344.
Final Office Action date mailed Jun. 29, 2009 for U.S. Appl. No. 11/260,344.
Examiner Interview Summary dated Oct. 1, 2009 and issued in U.S. Appl. No. 11/260,344.
RCE/Response filed Dec. 29, 2009 to Final Action dated Jun. 29, 2009 in U.S. Appl. No. 11/260,344.
Non-Final Action date mailed Jan. 28, 2010 in U.S. Appl. No. 11/260,344.
New Zealand Intellectual Property Office Examination Report dated Jul. 27, 2007 in New Zealand Patent Application No. 543958.
Response filed Jul. 28, 2010 for U.S. Appl. No. 11/260,344.
Final Office Action date mailed Sep. 14, 2010 for U.S. Appl. No. 11/260,344.

* cited by examiner

FLEXIBLE BAKEWARE HAVING A MULTI-PIECE CARRIER SYSTEM

CROSS-REFERENCE TO RELATED APPLICATIONS

This application is a continuation-in-part of and claims priority to U.S. patent application Ser. No. 10/685,052, filed Oct. 14, 2003 now U.S. Pat. No. 7,282,532, which claims priority to U.S. Provisional Application No. 60/476,325, filed Jun. 6, 2003. Priority is claimed to all of the above-mentioned applications, and each application is hereby incorporated by reference. This application further incorporates by reference the following concurrently-filed and commonly owned U.S. patent applications:

| U.S. patent application Title | Filing Date | Inventors |
|---|---|---|
| Flexible Bakeware Having a Clam Shell Carrier System | Dec. 29, 2004 | Russell T. DeBlassie Jeannie Holmes Samuel W. Heath, Jr. |
| Flexible Bakeware Having a Carrier System Disposed Within a Wall of the Bakeware | Dec. 29, 2004 | Steve Meeks Jeannie Holmes Samuel W. Heath, Jr. |
| Flexible Bakeware Having an Improved Carrier System with Tabs and Attachment Apertures | Dec. 29, 2004 | Steve Meeks Jeannie Holmes Samuel W. Heath, Jr. |

BACKGROUND OF THE INVENTION

1. Field of the Invention

This invention relates generally to flexible bakeware and in particular to an improved flexible bakeware container that is made from a novel compound and includes a carrier for assisting a user in carrying the bakeware container.

2. Description of Related Art

Flexible bakeware is typically made from a silicone rubber formulation. The silicone composition prevents strong odors from being transferred to the food, yet provides a tough, temperature resistant material that, due to its flexibility, allows food to be removed more easily than with traditional bakeware. One downside to using a silicone composition for bakeware is that the flexibility of the material makes it difficult to handle. The bakeware cannot be easily carried with one hand. Instead, it must be fully supported under its bottom surface, and most users simply place a metal cooking sheet or other rigid pan underneath the bakeware to transfer the bakeware to and from the oven. This solution is impractical because the presence of a solid sheet of metal underneath the flexible bakeware can provide inconsistent (and uneven) baking of the food product contained by the bakeware. More specifically, the sides and top of the bakeware experience convective heating from the hot air within the oven. The bottom of the bakeware experiences conductive heating since it is in direct contact with the solid metal cooking sheet. This difference in heating methods can cause uneven cooking of the food product. The inconvenience of using a cooking sheet to transport flexible bakeware is also a drawback.

A need therefore exists for an apparatus that could be used in conjunction with a flexible baking container that would permit easy transport of the baking container. A need further exists for an apparatus that could be incorporated into the flexible baking container so that together the device and bakeware are a self-contained unit. Still another need exists for an apparatus that can be readily removed from the baking container periodically for cleaning and storage.

Flexible bakeware also experiences release problems with certain foods. Compared to conventional non-flexible bakeware, it is often easier to remove foods from flexible bakeware because the basin containing the food product can be turned inside out. However, with certain foods such as muffins, cakes, or breads, residue from the foods may remain stuck to the flexible bakeware, thereby causing an uneven and unattractive outer surface on the food product following removal from the bakeware.

One solution to the problem of food release is to pre-lubricate a baking container with cooking spray, cooking oil, or flour. While this can prevent food from sticking to baking containers, the solution is undesirable because it involves additional steps in cooking the food (i.e. the step of pre-lubricating) and requires additional cooking supplies (i.e. the spray, oil, or flour). Another drawback is that the use of oils or flour can alter the taste and texture of the baked food product.

A need therefore exists for flexible bakeware that has improved food release qualities as compared to currently available flexible bakeware. A need further exists for a compound that can be easily and inexpensively manufactured into flexible bakeware. The compound should be non-toxic and should not impart an odor or taste to food products prepared in the bakeware.

BRIEF SUMMARY OF THE INVENTION

The problems presented by existing flexible bakeware are solved by the present invention. An elastomeric baking container is provided that includes a basin having a first carrier member disposed in an upper portion of the basin. A second carrier member is disposed in the upper portion of the basin such that the second carrier member is capable of movement relative to the first carrier member.

A flexible baking container according to the principles of the present invention includes a basin having at least one wall and a floor at a first end of the wall. A shoulder surrounds at least a portion of the basin, and the shoulder is attached to a second end of the wall opposite the floor. A receiving channel disposed within the shoulder, and a first and a second carrier member are received by the receiving channel. The second carrier member is at least partially spaced apart from the first carrier member to allow movement of the second carrier member relative to the first carrier member.

The baking containers of the present invention may be made from a compound including a methyl vinyl silicone polymer from about 40 to 70 weight percent, a filler from about 5 to 50 weight percent, a cross-linking agent from about 0.1 to 5 weight percent, and polytetrafluoroethylene from about 0.1 to 15 weight percent. In a preferred embodiment, the polytetrafluoroethylene is present in an amount of about 6 percent, and the cross-linking agent is chloro platanic acid.

Other objects, features, and advantages of the present invention will become apparent with reference to the drawings and detailed description that follow.

DETAILED DESCRIPTION OF THE PREFERRED EMBODIMENT

Figure 1:
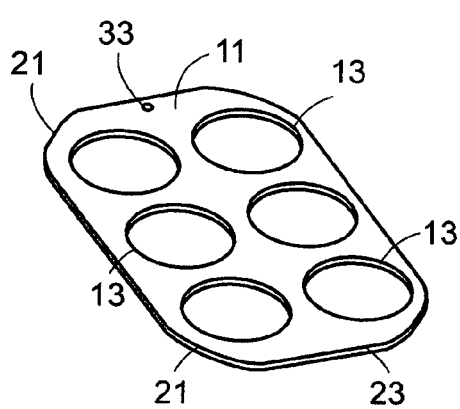
FIG. 1 depicts a perspective view of a flexible bakeware carrier for a plurality of flexible muffin cups according to a preferred embodiment of the present invention.
Figure 2:
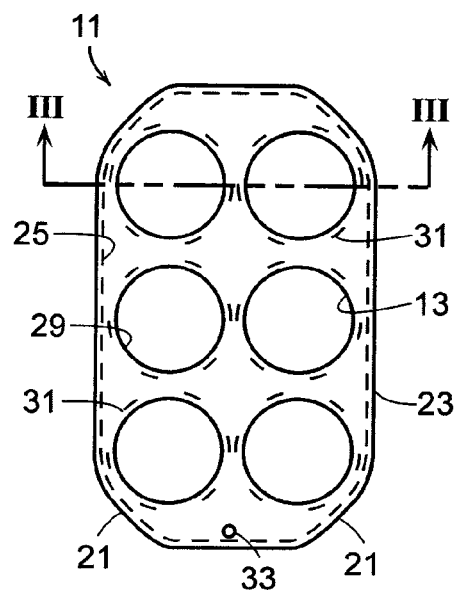
FIG. 2 illustrates a top view of the flexible bakeware carrier of FIG. 1.
Figure 3:
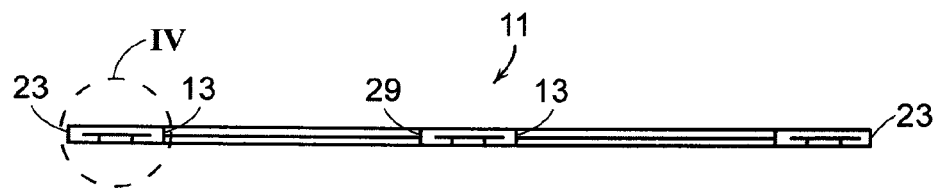
FIG. 3 depicts a cross-sectional front view of the flexible bakeware carrier of FIG. 2 taken at III-III.
Figure 4:
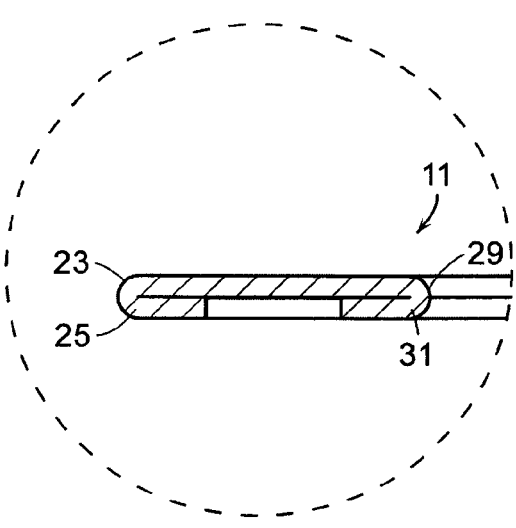
FIG. 4 illustrates an enlarged front view of the of flexible bakeware carrier of FIG. 3 taken at Detail IV.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

In describing the present invention, the term "elastomer" refers generally to a polymeric material that has rubberlike properties. More specifically, most elastomers have elongation rates greater than 100% and a significant amount of resilience. The resilience of a material refers to the material's ability to recover from an elastic deformation. Examples of elastomers could include, but are not limited to, natural rubbers, polyisoprene, styrene butadiene rubber, chloroprene rubber, polybutadiene, nitrile rubber, butyl rubber, ethylene propylene rubber, ethylene propylene diene monomer, chlorosulfonated polyethylene, polysulfide rubber, polyurethane, and silicones.

The term "flexible" refers to an object or material that is able to be bent or flexed. The use of the term flexible in connection with a material or bakeware of the present invention generally refers to a material or bakeware made from an elastomer or other material that allows the container portion, or basin, of the bakeware to be at least partially turned inside out without plastic deformation of the material.

Referring to FIGS. 1-4, a carrier 11 according to the principles of the present invention is illustrated. The carrier apparatus 11 is used in conjunction with flexible muffin cups. Carrier 11 is a substantially rigid, flat plate made from either metal or temperature-resistant plastic. Carrier 11 includes a plurality of apertures 13, each adapted to receive a flexible muffin cup. Carrier 11 is preferably rectangular in shape with a chamfer 21 at each corner of the carrier. Carrier 11 is preferably made from brushed stainless steel, and all perimeter edges 23 of the carrier 11 have been rolled to form a perimeter lip 25 (see FIG. 4). Similarly, the edges 29 of apertures 13 have also been rolled to form perimeter lips 31. By rolling the exposed edges 23, 25 of the carrier 11, the sharpness of the edges is eliminated. Carrier 11 also includes a hanger hole 33 at one end of the carrier 11 for allowing the carrier to be hung on a kitchen wall.

Figure 5:
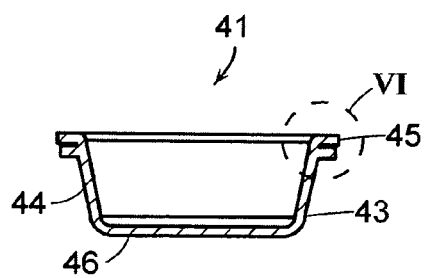
FIG. 5 depicts a cross-sectional front view of a flexible muffin cup according to a preferred embodiment of the present invention, the muffin cup designed for use with the flexible bakeware carrier of FIG. 1.
Figure 6:
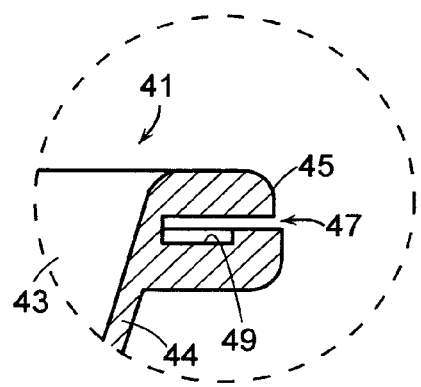
FIG. 6 illustrates an enlarged front view of the flexible muffin cup of FIG. 5 taken at Detail VI.

Referring to FIGS. 5 and 6, a flexible baking container, or muffin cup 41, according to the principles of the present invention includes a basin 43 formed by a substantially cylindrical, tapering wall 44 integrally connected to a floor 46. One end of wall 44 terminates in a shoulder 45, the shoulder having a receiving channel 47. Receiving channel 47 preferably includes a depression 49 that is adapted to receive the perimeter lip 31 of carrier 11. In order to obtain optimum flexibility and release, the wall thickness of each muffin cup should be between 0.020 and 0.100 inches. Preferably, the wall thickness is 0.050-0.075 inches.

In operation, each aperture 13 on carrier 11 receives a muffin cup 41 such that a portion of the carrier 11 fits within receiving channel 47. When installed, the perimeter lip 31 of the carrier 11 is firmly seated in the depression 49 of the receiving channel 47. The engagement of the lip 31 by depression 49 more firmly secures the muffin cups 41 on the carrier and prevents accidental or inadvertent disengagement of the muffin cups 41 and the carrier 11.

The carrier 11 provides rigidity to the muffin cups 41 in an area around each shoulder 45 and allows a user to carry the flexible muffin cups 15 with one hand. The flexibility of the muffin cups 41 allows a user to easily remove the cups from the carrier 11. The removal of the muffin cups could aid a user in removing food from the muffin cup, although it is not necessary to remove the cup to effectuate release of a food product. The ease with which the muffin cups can be removed also promotes the use of muffin cups having different shapes and depths. For example, a muffin cup having a basin 17 that is heart shaped may be used to bake heart-shaped muffins on Valentine's Day. Other possible shapes include without limitation stars, clover leaves, squares, triangles, and diamonds.

Figure 7:
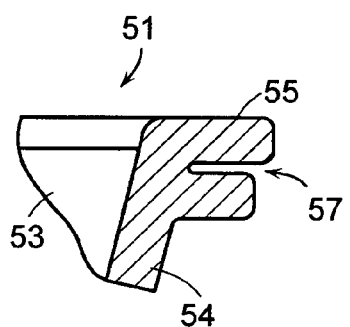
FIG. 7 depicts an enlarged front view of a flexible muffin cup according to an alternative embodiment of the present invention, the view being taken at an area of the flexible muffin cup similar to that shown in FIG. 6.
Figure 8:
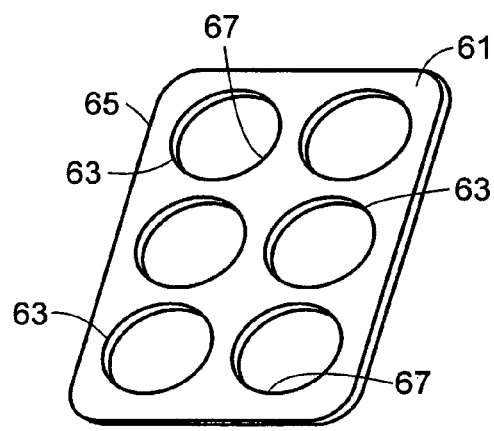
FIG. 8 illustrates a perspective view of a flexible bakeware carrier for a plurality of flexible muffin cups according to an alternative embodiment of the present invention.
Figure 9:
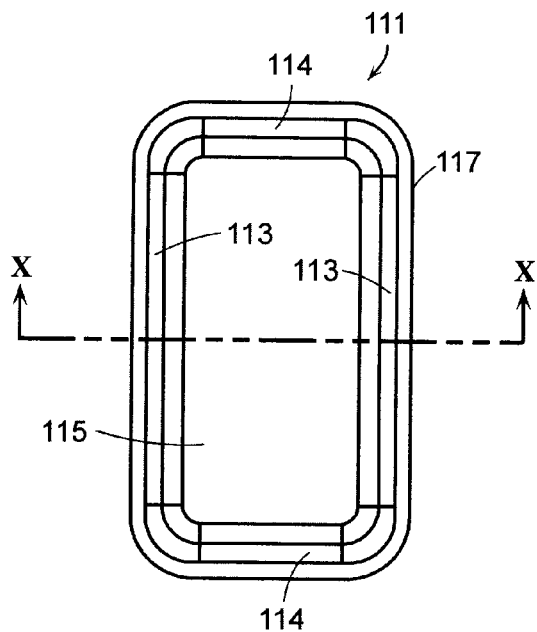
FIG. 9 depicts a top view of a rectangular, flexible bakeware according to a preferred embodiment of the present invention.
Figure 10:
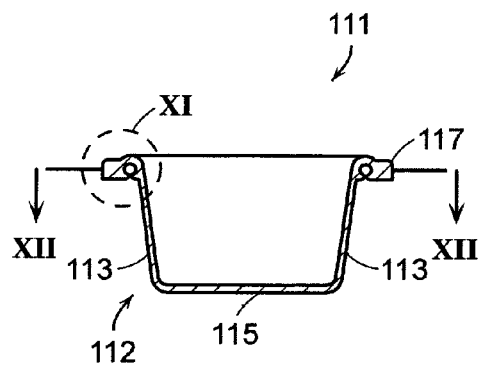
FIG. 10 illustrates a cross-sectional front view of the rectangular, flexible bakeware of FIG. 9 taken at X-X.

Referring to FIGS. 7 and 8, a muffin cup 51 and a carrier 61 according to the principles of the present invention are illustrated. Muffin cup 51 is similar to muffin cup 41 and includes a basin 53 formed by a substantially cylindrical, tapering wall 54 connected to a floor (not shown) at one end and terminating in a shoulder 55 at another end. Shoulder 55 includes a receiving channel 57, but unlike muffin cup 41, does not include a depression 49.

Muffin cup 51 is designed for use with a carrier such as carrier 11, or preferably carrier 61. Referring to FIG. 8, carrier 61 is a rectangular, flat plate made from metal or temperature-resistant plastic. Carrier 61 includes a plurality of apertures 63 for receiving muffin cups 51. The primary difference between carrier 61 and carrier 11 (FIGS. 1-4) is that carrier 61 does not include rolled lips at perimeter edges 65 or edges 67 of the apertures. The lack of a lip at edges 67 allows the carrier 11 to better mate with muffin cup 61, which includes no depression in receiving channel 57.

Figure 11:
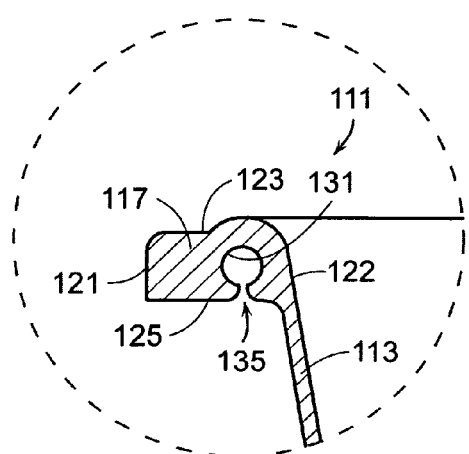
FIG. 11 depicts an enlarged front view of the rectangular, flexible bakeware of FIG. 10 taken at Detail XI.

Referring to FIGS. 9-12, a rectangular, flexible baking container 111 according to the principles of the present invention includes a basin 112 formed by a pair of major walls 113 and a pair of minor walls 114, the walls 113, 114 being integrally joined to each other and at one end to a floor 115. A shoulder 117 is formed at an end of the walls 113, 114 opposite floor 115, the shoulder 117 extending completely around the perimeter of the baking container 111. Shoulder 117 includes an outer surface 121, an inner surface 122, an upper surface 123, and a lower surface 125. A receiving channel 131 having a circular cross section is disposed in the shoulder 117 with an entry slot 135 positioned between the lower surface 125 of the shoulder 117 and the receiving channel 131. In the preferred embodiment, the entry slot 135 is disposed adjacent the lower surface 125 (as shown in FIG. 11), but it is conceivable that the entry slot 135 could be disposed adjacent the outer surface 121, the inner surface 122, or the upper surface 123.

Figure 12:
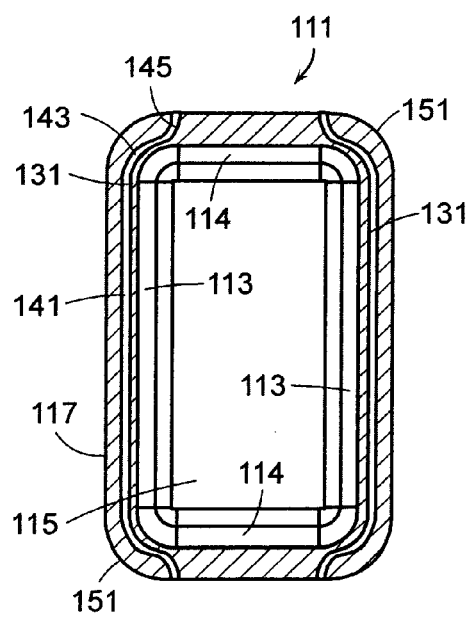
FIG. 12 illustrates a cross-sectional top view of the rectangular, flexible bakeware of FIG. 10 taken at XII-XII.

Referring more specifically to FIG. 12, the receiving channel 131 and entry slot 135 are not continuous around the entire perimeter of the flexible baking container 111. Instead, the receiving channel 131 includes a central portion 141 that runs continuously in the shoulder 117 adjacent each major wall 113. As the receiving channel 131 approaches corner portions 151 of the shoulder 117, a turning portion 143 of the receiving channel 131 follows the shoulder around the corner portion 151. An exit portion 145 of the receiving channel then turns in a direction opposite minor walls 114 and exits the outer surface 121 of the shoulder 117. Because of the discontinuous nature of the receiving channel 131, the baking container 111 actually contains a pair of receiving channels 131 as illustrated in FIG. 12.

The preferred location of the central portion 141 of the receiving channel 131 is in the shoulder 117 adjacent each major wall 113. This configuration provides the most support for the carrier that is received by the receiving channel 131

(explained in more detail below). However, a person of ordinary skill in the art will recognize that the central portion 141 of each receiving channel 131 could instead be located in the shoulder adjacent each minor wall 114.

Figure 13:
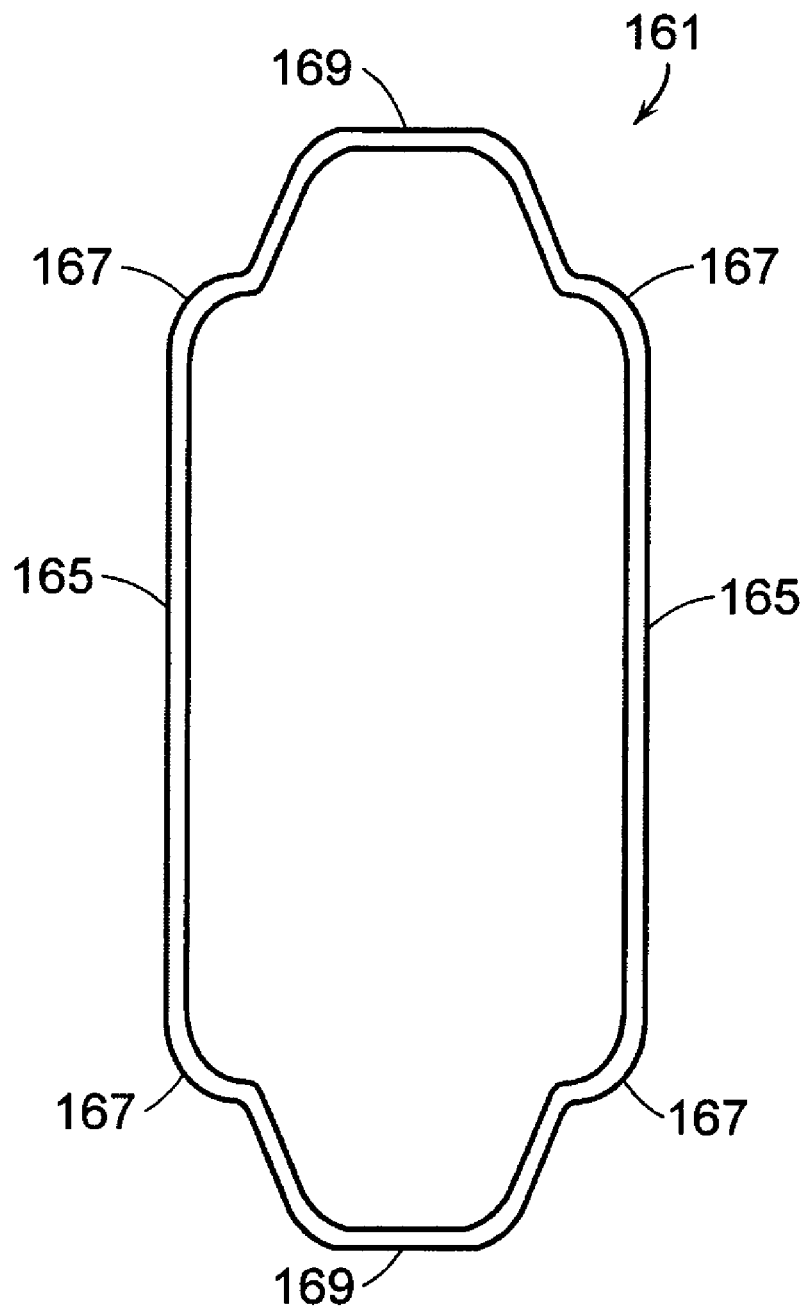
FIG. 13 depicts a top view of a flexible bakeware carrier according to a preferred embodiment of the preferred invention, the carrier designed for use with the flexible bakeware of FIG. 9.

Referring to FIG. 13, a carrier 161 according to the principles of the present invention is used in conjunction with flexible baking container 111. Carrier 161 is formed by a substantially rigid rod having a substantially circular cross section and made of metal or temperature-resistant plastic. Preferably, the material composition of the rod is 304 stainless steel. Carrier 161 includes a pair of central stays 165 that are substantially parallel to one another and are joined at each end to an arcuate stay 167. An end of each arcuate stay 167 is joined to one end of a handle 169. Together, the pair of central stays 165, the four arcuate stays 167, and the pair of handles 169 form a closed loop. The shape and length of the central stays and the arcuate stays closely approximate those of central portion 141 and turning portion 143 of the receiving channel 131. Preferably, the central stays 165, arcuate stays 167, and handles 169 are welded together from stainless steel rods, but the carrier 161 could be formed using any other suitable manufacturing techniques known to those of ordinary skill in the art.

In operation, carrier 161 is received by flexible baking container 111 by inserting the centrals stays 165 and arcuate stays 167 through the entry slot 135 of the baking container 111 and into the receiving channel 131. The flexible properties of the baking container 111 allow the shoulder 117 to bend such that the entry slot 135 is temporarily enlarged to accommodate the carrier 161 as it passes through the entry slot 135 and into the receiving channel 131. After the central stays 165 are positioned within the central portions 141 of the receiving channels 131 and the arcuate stays 167 are positioned within the turning portions 143 of the receiving channels 131, the shoulder 117 elastically returns to its original shape. With the shoulder in a "non-deformed" shape, the entry slot 135 is again smaller than the receiving channel 131, which secures carrier 161 within the receiving channel 131.

With the carrier 161 installed in the receiving channel 131, a portion of the handle 169 is disposed within the exit portion 145 of the receiving channel, but the majority of the handle 169 is located outside the walls of the flexible baking container 111. Handle 169 enables a user of the flexible baking container 111 to easily lift and carry the baking container 111 by holding either one or both handles on that portion of the handle 169 that protrudes from the baking container.

The carrier 161 provides rigidity to the flexible baking container 111 in an area around each shoulder 117 and allows a user to more easily lift and carry the baking container 111. The flexibility of the baking container 111 allows a user to easily remove the carrier 161 from the receiving channel 131 of the baking container 111. The removal of the carrier 161 could aid a user in removing food from the baking container 111, although it is not necessary to remove the carrier 161 to effectuate release of a food product.

Figure 17:
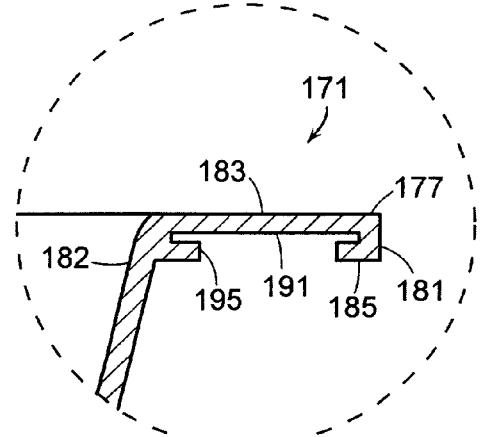
FIG. 17 depicts an enlarged front view of the rectangular, flexible bakeware of FIG. 16 taken at Detail XVII.
Figure 18:
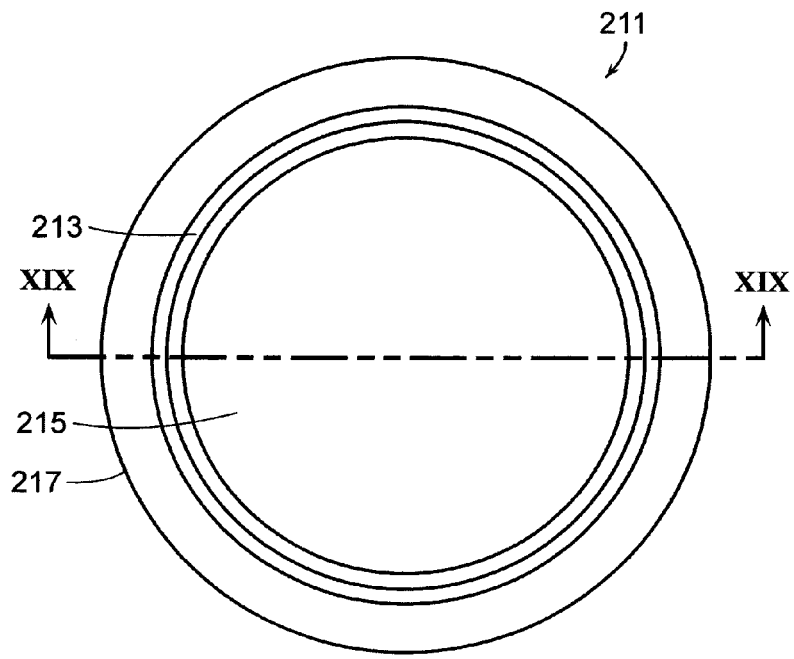
FIG. 18 illustrates a top view of a round, flexible bakeware according to a preferred embodiment of the present invention.
Figure 19:
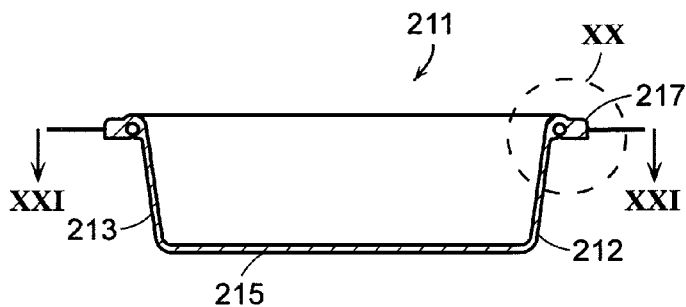
FIG. 19 depicts a cross-sectional front view of the round, flexible bakeware of FIG. 18 taken at XIX-XIX.

Referring to FIGS. 14-17, a rectangular, flexible baking container 171 according to the principles of the present invention includes a basin 172 formed by a pair of major walls 173 and a pair of minor walls 174, the walls 173, 174 being integrally joined to each other and at one end to a floor 175. A shoulder 177 is formed at an end of the walls 173, 174 opposite floor 175, the shoulder 177 extending completely around the perimeter of the baking container 171. Shoulder 177 includes an outer surface 181, an inner surface 182, an upper surface 183, and a lower surface 185. A receiving channel 191 having a rectangular cross section is disposed in the shoulder 177 with an entry slot 195 positioned between the lower surface 185 of the shoulder 177 and the receiving channel 191. In the preferred embodiment, the entry slot 195 is disposed adjacent the lower surface 185 (as shown in FIG. 17), but it is conceivable that the entry slot 195 could be disposed adjacent the outer surface 181, the inner surface 182, or the upper surface 183.

The receiving channel 191 and entry slot 195 are preferably continuous around the entire perimeter of the flexible baking container 171. However, it is conceivable that a discontinuous receiving channel 191 and entry slot 195 could be used similar to those of baking container 111 (see FIG. 12).

Figure 14:
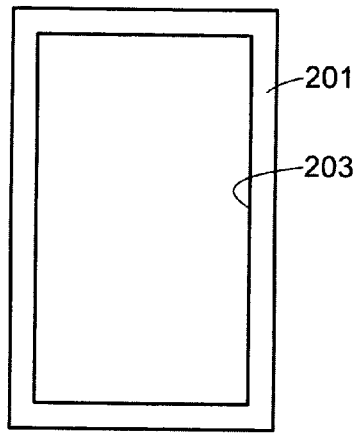
FIG. 14 illustrates a top view of a flexible bakeware carrier according to an alternative embodiment of the present invention.
Figure 15:
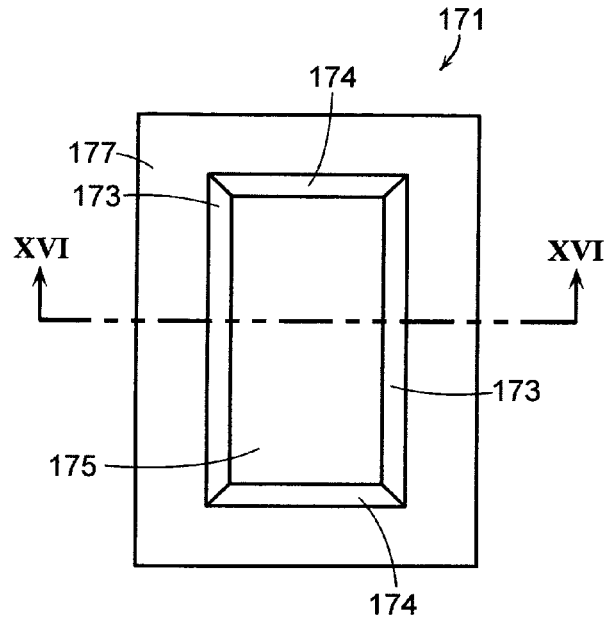
FIG. 15 depicts a top view of a rectangular, flexible bakeware according to an alternative embodiment of the present invention, the bakeware designed for use with the carrier of FIG. 14.
Figure 16:
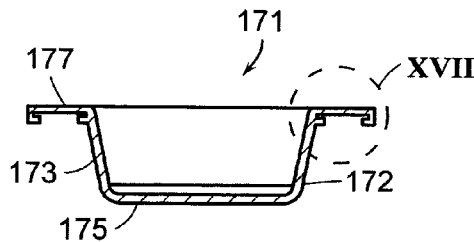
FIG. 16 illustrates a cross-sectional front view of the rectangular, flexible bakeware of FIG. 15 taken at XVI-XVI.

Referring more specifically to FIG. 14, a carrier 201 according to the principles of the present invention is used in conjunction with flexible baking container 171. Carrier 201 is a rectangular plate having a central aperture 203 and is made of metal or temperature-resistant plastic. The shape and size of carrier 201 closely approximate those of the receiving channel 191 of baking container 171.

In operation, carrier 201 is received by flexible baking container 171 by inserting the carrier 201 through the entry slot 195 of the baking container 171 and into the receiving channel 191. The flexible properties of the baking container 171 allow the shoulder 177 to bend such that the entry slot 195 is temporarily enlarged or deformed to accommodate the carrier 201 as it passes through the entry slot 195 and into the receiving channel 191. After the carrier 201 is positioned within the receiving channel 191, the shoulder 177 elastically returns to its original shape. With the shoulder 177 in a "non-deformed" shape, the entry slot 195 is again smaller than the receiving channel 191, which secures carrier 201 within the receiving channel 191.

Carrier 201 provides rigidity to the flexible baking container 171 in an area around shoulder 177 and allows a user to more easily lift and carry the baking container 171. The flexibility of the baking container 171 allows a user to easily remove the carrier 201 from the receiving channel 191 of the baking container 171. The removal of the carrier 201 could aid a user in removing food from the baking container, although it is not necessary to remove the carrier 201 to effectuate the release of a food product.

Figure 20:
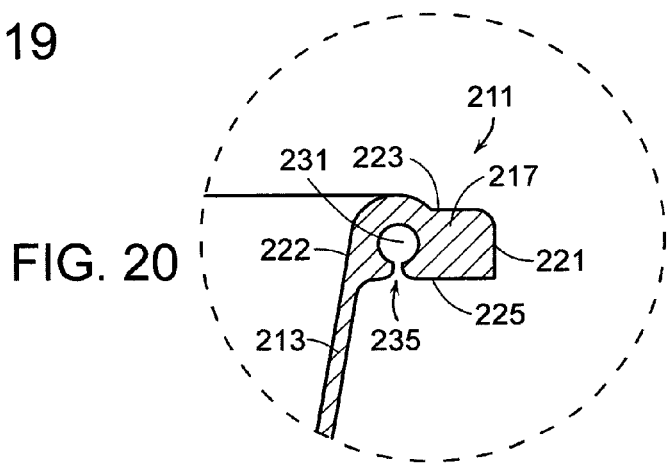
FIG. 20 illustrates an enlarged front view of the round, flexible bakeware of FIG. 19 taken at Detail XX.

Referring to FIGS. 18-21, a round, flexible baking container 211 according to a preferred embodiment of the present invention includes a basin 212 formed by a substantially cylindrical, tapering wall 213 that is integrally joined at one end to a floor 215. A shoulder 217 is formed at an end of the wall 213 opposite floor 215, the shoulder 217 extending completely around the perimeter of the baking container 211. Shoulder 217 includes an outer surface 221, an inner surface 222, an upper surface 223, and a lower surface 225. A receiving channel 231 having a circular cross section is disposed in the shoulder 217 with an entry slot 235 positioned between the lower surface 225 of the shoulder 217 and the receiving channel 231. In the preferred embodiment, the entry slot 235 is disposed adjacent the lower surface 225 (as shown in FIG. 20), but it is conceivable that the entry slot 235 could be disposed adjacent the outer surface 221, the inner surface 222, or the upper surface 223.

Figure 21:
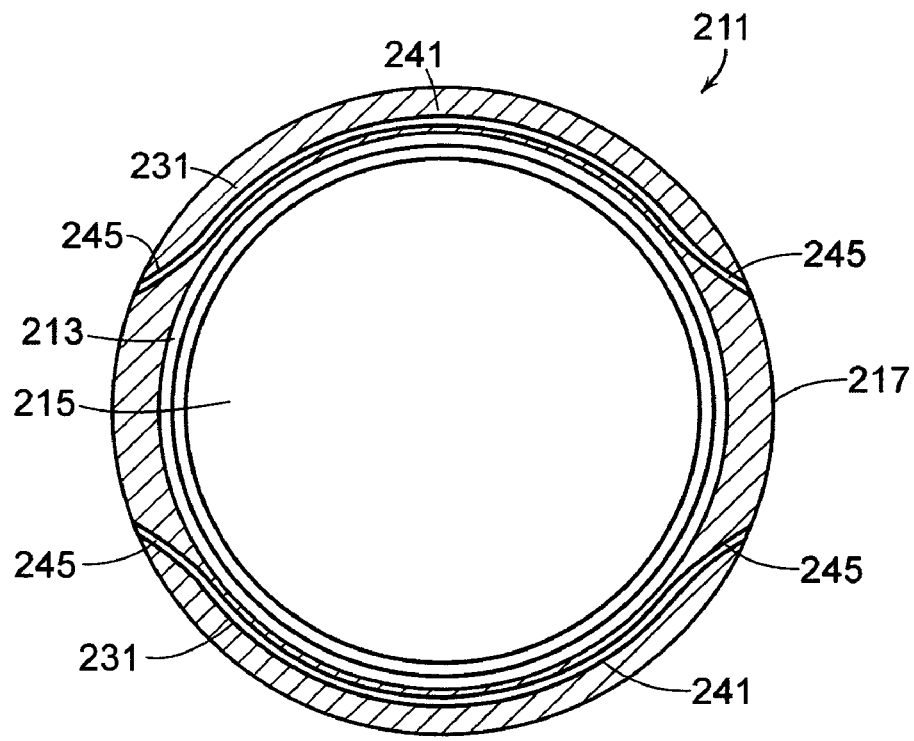
FIG. 21 depicts a cross-sectional top view of the round, flexible bakeware of FIG. 19 taken at XXI-XXI.

Referring more specifically to FIG. 21, the receiving channel 231 and entry slot 235 are not continuous around the entire perimeter of the flexible baking container 211. Instead, the receiving channel 231 includes an arcuate portion 241 that is continuous in a portion of the shoulder 217 and subtends an angle that is preferably greater than or equal to 90 degrees. An exit portion 245 is of the receiving channel 231 is located at both ends of the arcuate portion 241. Exit portion 245 turns in a direction away from wall 213 and exits the outer surface 221 of the shoulder 217. Because of the discontinuous nature of the receiving channel 231, the baking container 211 actually contains a pair of receiving channels 231 diametrically opposed on the shoulder 217 (see FIG. 21).

Figure 22:
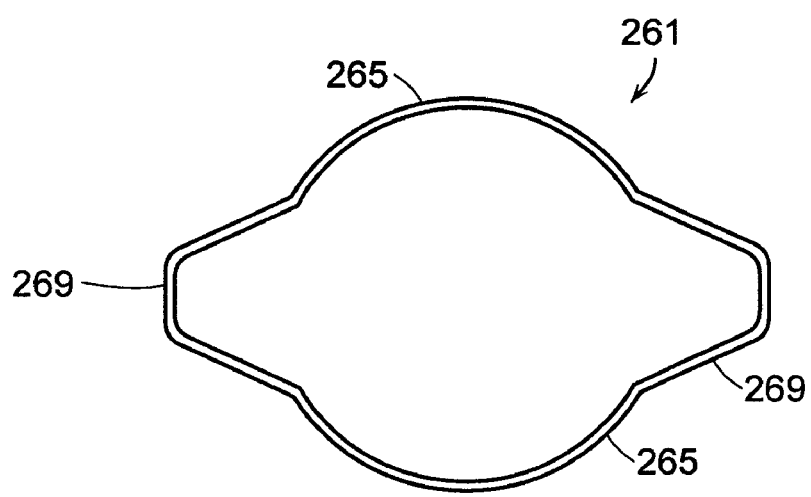
FIG. 22 illustrates a top view of a flexible bakeware carrier according to a preferred embodiment of the present invention, the carrier designed for use with the round, flexible bakeware of FIG. 18.

Referring to FIG. 22, a carrier 261 according to the principles of the present invention is used in conjunction with flexible baking container 211. Carrier 261 is formed by a substantially rigid rod having a substantially circular cross section and made of metal or temperature-resistant plastic. Preferably, the material composition of the rod is 304 stainless steel. Carrier 261 includes a pair of central stays 265 that are joined at each end to a handle 269. Together, the pair of central stays 265 and the pair of handles 269 form a closed loop. The shape and length of the central stays 265 closely approximate those of arcuate portion 241 of the receiving channel 231. Preferably, the central stays 265 and handles 269 are welded together from stainless steel rods, but the carrier 261 could be formed using any other suitable manufacturing techniques known to those of ordinary skill in the art.

In operation, carrier 261 is received by flexible baking container 211 by inserting the centrals stays 265 and a portion of the handles 269 through the entry slot 235 of the baking container 211 and into the receiving channel 231. The flexible properties of the baking container 211 allow the shoulder 217 to deform such that the entry slot 235 is temporarily enlarged to accommodate the carrier 261 as it passes through the entry slot 235 and into the receiving channel 231. After the central stays 265 are positioned within the arcuate portions 241 of the receiving channels 231, the shoulder 217 elastically returns to its original shape. With the shoulder in a "non-deformed" shape, the entry slot 235 is again smaller than the receiving channel 231, which secures carrier 261 within the receiving channel 231.

With the carrier 261 installed in the receiving channel 231, a portion of the handle 269 is disposed within the exit portion 245 of the receiving channel, but the majority of the handle 269 is located outside the wall of the flexible baking container 211. Handle 269 enables a user of the flexible baking container 211 to easily lift and carry the baking container 211 by holding either one or both handles on the portion of the handle 269 that protrudes from the baking container.

The carrier 261 provides rigidity to the flexible baking container 211 in an area around each shoulder 217 and allows a user to more easily lift and carry the baking container 211. The flexibility of the baking container 211 allows a user to easily remove the carrier 261 from the receiving channel 231 of the baking container 211. The removal of the carrier 261 could aid a user in removing food from the baking container 211, although it is not necessary to remove the carrier 261 to effectuate the release of a food product.

Figure 26:
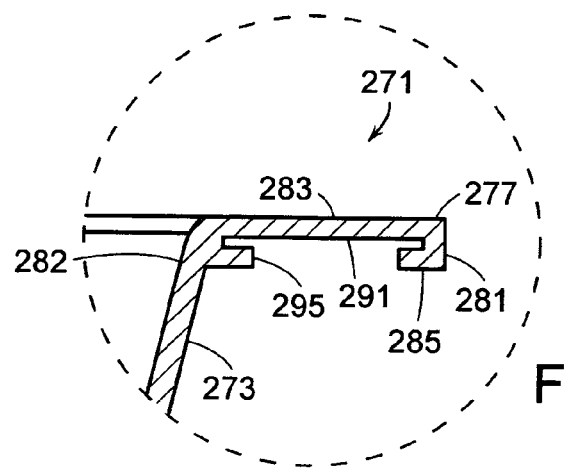
FIG. 26 illustrates an enlarged front view of the round, flexible bakeware of FIG. 25 taken at Detail XVI.

Referring to FIGS. 23-26, a round, flexible baking container 271 according to the principles of the present invention includes a basin 272 formed by a substantially cylindrical, tapering wall 273 that is integrally joined at one end to a floor 275. A shoulder 277 is formed at an end of the wall 273 opposite floor 275, the shoulder 277 extending completely around the perimeter of the baking container 271. Shoulder 277 includes an outer surface 281, an inner surface 282, an upper surface 283, and a lower surface 285. A receiving channel 291 having a rectangular cross section is disposed in the shoulder 277 with an entry slot 295 positioned between the lower surface 285 of the shoulder 277 and the receiving channel 291. In the preferred embodiment, the entry slot 295 is disposed adjacent the lower surface 285 (as shown in FIG. 26), but it is conceivable that the entry slot 295 could be disposed adjacent the outer surface 281, the inner surface 282, or the upper surface 283.

The receiving channel 291 and entry slot 295 are preferably continuous around the entire perimeter of the flexible baking container 271. However, it is conceivable that a discontinuous receiving channel 291 and entry slot 295 could be used similar to that of baking container 211 (see FIG. 21).

Figure 23:
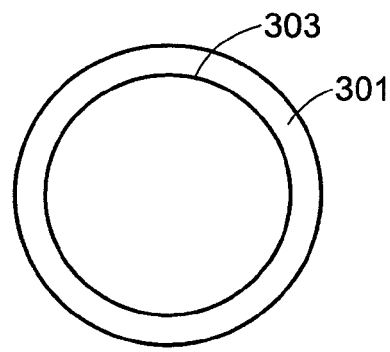
FIG. 23 depicts a top view of a flexible bakeware carrier according to an alternative embodiment of the present invention.
Figure 24:
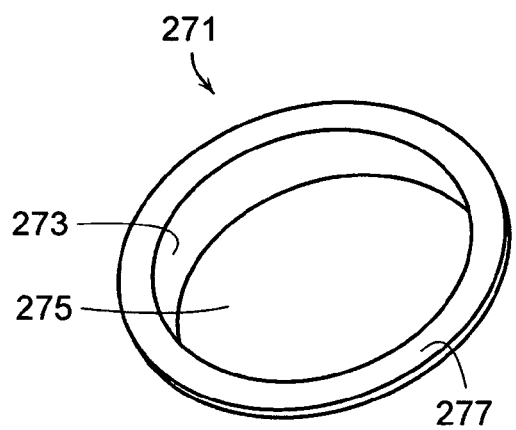
FIG. 24 illustrates a perspective view of a round, flexible bakeware according to an alternative embodiment of the present invention, the flexible bakeware designed for use with the flexible bakeware carrier of FIG. 23.
Figure 25:
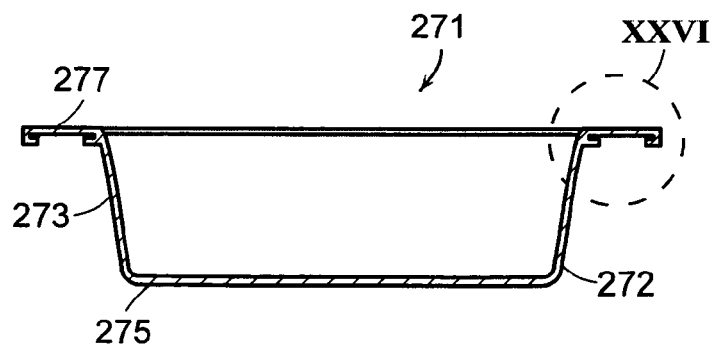
FIG. 25 depicts a cross-sectional front view of the round, flexible bakeware of FIG. 24.

Referring more specifically to FIG. 23, a carrier 301 according to the principles of the present invention is used in conjunction with flexible baking container 271. Carrier 301 is a ring-shaped plate having a central aperture 303 and is made of metal or temperature-resistant plastic. The shape and size of carrier 301 closely approximate those of the receiving channel 291 of baking container 271.

In operation, carrier 301 is received by flexible baking container 271 by inserting the carrier 301 through the entry slot 295 of the baking container 271 and into the receiving channel 291. The flexible properties of the baking container 271 allow the shoulder 277 to bend such that the entry slot 295 is temporarily enlarged or deformed to accommodate the carrier 301 as it passes through the entry slot 295 and into the receiving channel 291. After the carrier 301 is positioned within the receiving channel 291, the shoulder 277 elastically returns to its original shape. With the shoulder 277 in a "non-deformed" shape, the entry slot 295 is again smaller than the receiving channel 291, which secures carrier 301 within the receiving channel 291.

Carrier 301 provides rigidity to the flexible baking container 271 in an area around shoulder 277 and allows a user to more easily lift and carry the baking container 271. The flexibility of the baking container 271 allows a user to easily remove the carrier 301 from the receiving channel 291 of the baking container 271. The removal of the carrier 301 could aid a user in removing food from the baking container, although it is not necessary to remove the carrier 301 to effectuate the release of a food product.

Figure 27:
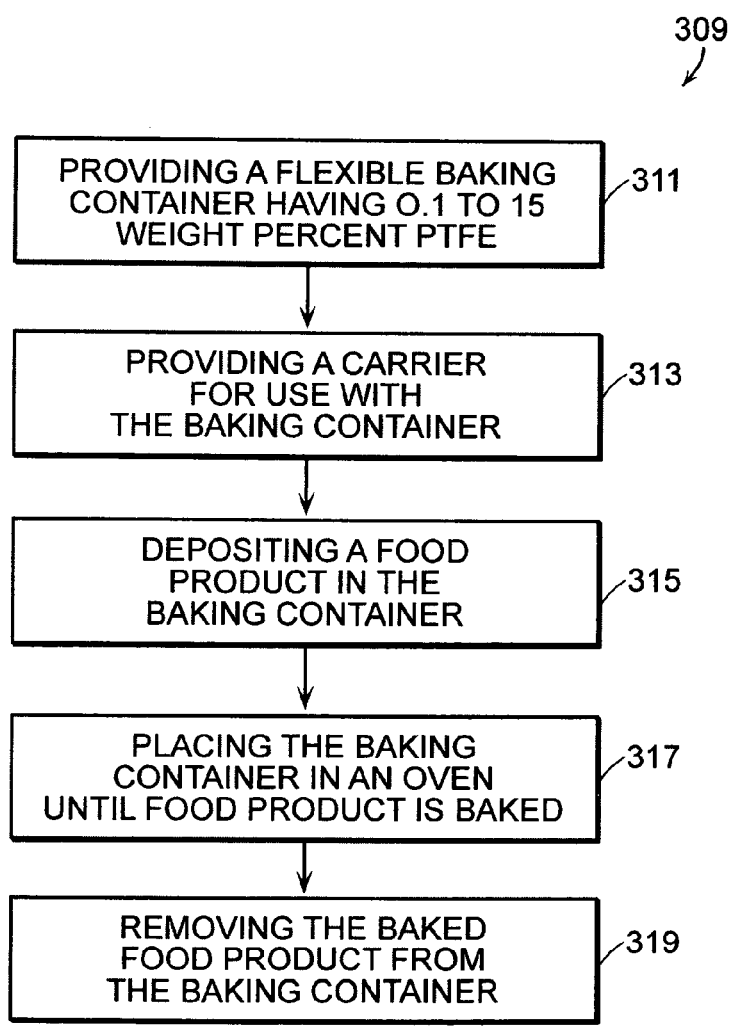
FIG. 27 depicts a flow chart of a method of baking a food product according to the present invention.
Figure 28:
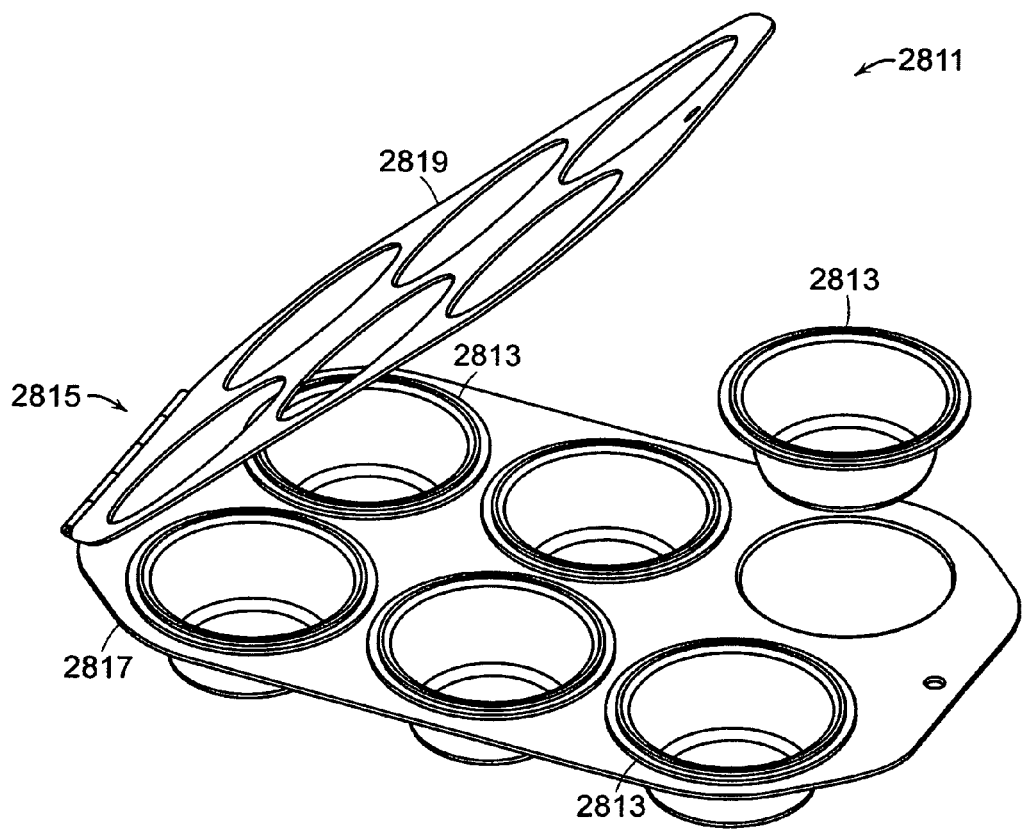
FIG. 28 illustrates a perspective view of a bakeware apparatus having a flexible baking container and a carrier, the carrier having an upper support member and a lower support member according to principles of the present invention.

Referring to FIG. 27, a method for baking a food product 309 according to the present invention includes, in step 311, providing a flexible baking container formed from an addition-cured silicone polymer having polytetrafluoroethylene in an amount of about 0.1 to 15 weight percent. In step 313, a carrier adapted to be received by a receiving channel in the flexible baking container is provided. A user deposits a food product in the baking container at step 315, and the baking container is placed in an oven at a baking temperature for a predetermined time until the food product is baked at step 317. The baked food product is removed from the baking container at step 319.

Several variations of the method illustrated in FIG. 27 are possible. First, the use of the carrier is not required if the baking container is made from the novel flexible bakeware compound of the present invention. Alternatively, the carrier may be used with a traditional flexible baking container instead of one incorporating the flexible bakeware compound. In either situation, all of the features and advantages explained previously in connection with the flexible bakeware compound and carrier are applicable to the bakeware used with the method.

Referring to FIGS. 28-32, a bakeware apparatus 2811 according to the principles of the present invention includes a plurality of flexible baking containers 2813 and a carrier 2815 adapted to carry the flexible baking containers. Carrier 2815 includes a lower support member 2817 hingedly connected to an upper support member 2819.

Figures 29, 30:
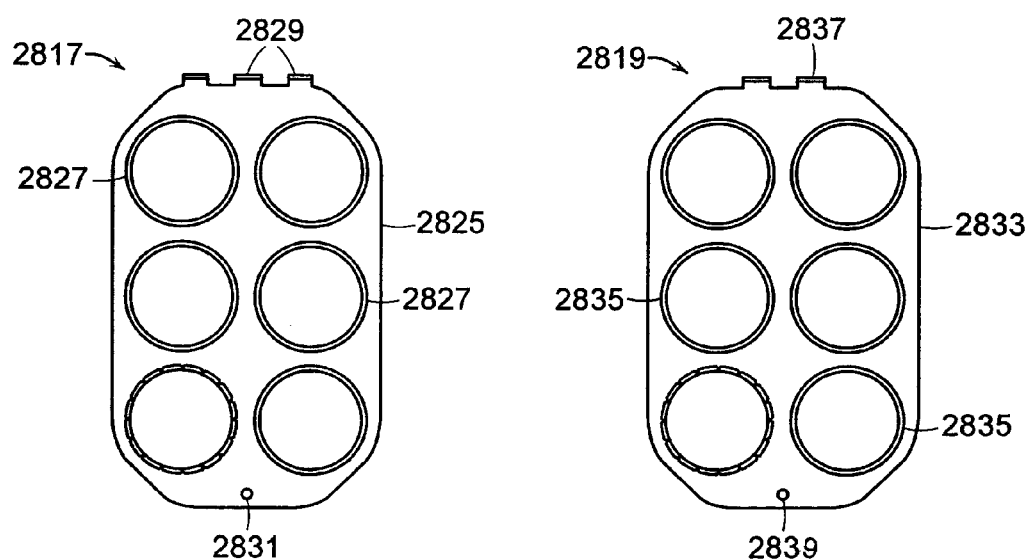
FIG. 29 depicts a bottom view of the lower support member of FIG. 28.
FIG. 30 illustrates a bottom view of the upper support member of FIG. 28.

Referring more specifically to FIGS. 29 and 30, the lower support member 2817 includes a substantially planar plate 2825 with a plurality of apertures 2827 disposed in the plate 2825. On one end of the lower support member 2817, a plurality of hinge members 2829 are included to allow attachment to upper support member 2819. A hanger hole 2831 is also positioned in lower support member to allow hanging of the lower support member during non-use or to facilitate locking of the lower support member to the upper support member. The upper support member 2819 includes a substantially planar plate 2833 having a plurality of apertures 2835 disposed in the plate 2833. A plurality of hinge members 2837 are positioned at one end of the plate 2833 to allow the upper support member 2819 and the lower support member 2817 to be hingedly attached to one another. It is important to note that the lower and upper support members 2817, 2819 could also be attached by a living hinge or any other mechanism that allows the opening and closing of the support members 2817, 2819 relative to one another. A hanger hole 2839 is also positioned in plate 2833 to facilitate storage or locking of the support members 2817, 2819 in conjunction with hanger hole 2831.

When lower support member 2817 and upper support member 2819 are hingedly attached, the support members 2817, 2819 can be moved between an open position (shown in FIG. 28) and a closed position (not shown). In the open position, the flexible baking containers 2813 can be easily removed from or placed within the apertures 2827 of the lower support member 2817. In the closed position, the upper support member 2819 ensures that the flexible baking containers 2813 are securely held in place between the support members 2817, 2819. The placement of the apertures 2827 and 2835 in the support members 2817, 2819 is such that when the support members 2817, 2819 are in the closed position, the apertures on the different support members 2817, 2819 are concentrically aligned with one another. It is preferred that a locking mechanism also be included and operably attached to the lower support member 2817 and the upper support member 2819 to allow the support members 2817, 2819 to be locked in the closed position to prevent accidental or inadvertent dislodgement of the flexible baking containers 2813 from the carrier 2815.

Figure 31:
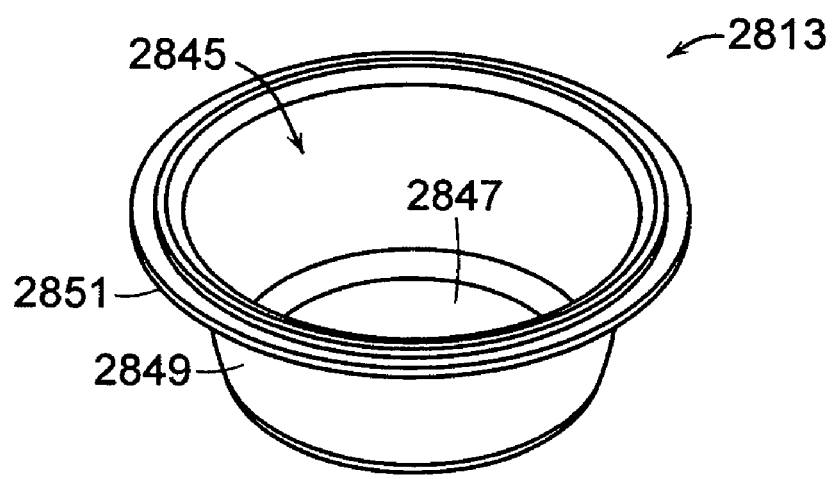
FIG. 31 depicts a perspective view of the flexible baking container of FIG. 28.
Figure 32:
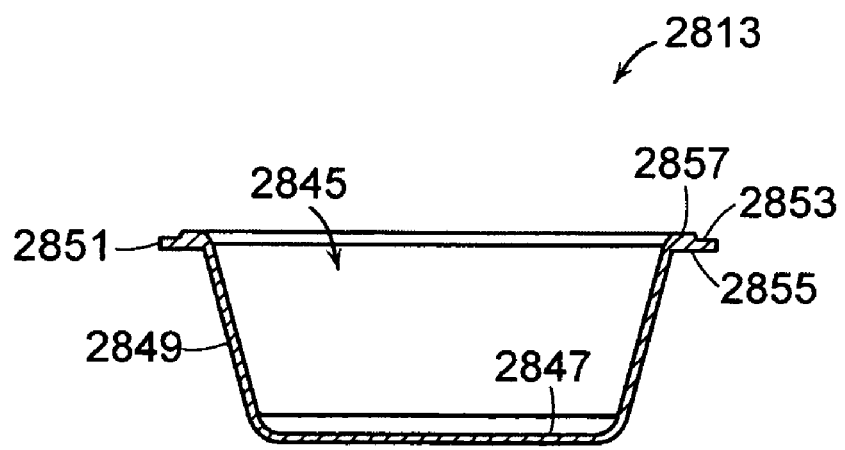
FIG. 32 illustrates a cross-sectional side view of the flexible baking container of FIG. 28.

Referring more specifically to FIGS. 31 and 32, flexible baking container 2813 preferably includes a basin 2845 having a floor 2847 surrounded by and integrally connected to a cylindrical wall 2849. A shoulder 2851 is integrally connected to the wall 2849 at an end of the wall opposite floor 2847. A recessed region 2853 is provided on the shoulder 2851, and the shoulder further includes a lower engagement surface 2855. The flexible baking container 2813, and more specifically the shoulder 2851, are sized such that when the flexible baking container 2813 is placed within the aperture 2827 of the lower support member 2817, the lower engagement surface 2855 of the shoulder rests upon the plate 2825. The shoulder 2851 prevents the flexible baking container 2813 from passing entirely through the aperture 2827 of the lower support member 2817. The recessed region 2853 is sized and positioned such that when the carrier 2815 is placed in the closed position, the plate 2833 of the upper support member 2819 preferably rests within the recessed region 2853. An upper surface 2857 of the shoulder is not engaged by the upper support member 2819, but rather extends through the aperture 2835 on the upper support member 2819. The recessed region 2853 allows a more secure engagement of the flexible baking containers 2813 when the carrier 2815 is placed in the closed position.

Figure 33:
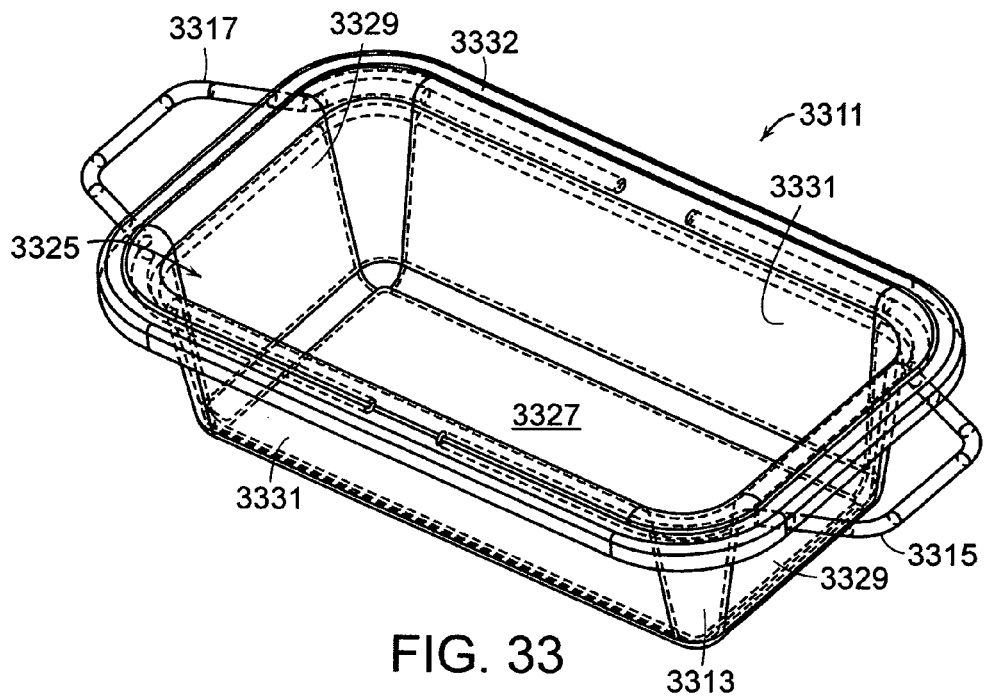
FIG. 33 depicts a perspective view of a bakeware apparatus having a flexible baking container, a first carrier member, and a second carrier member according to the principles of the present invention, the first and second carrier members being partially shown in hidden lines.
Figure 34:
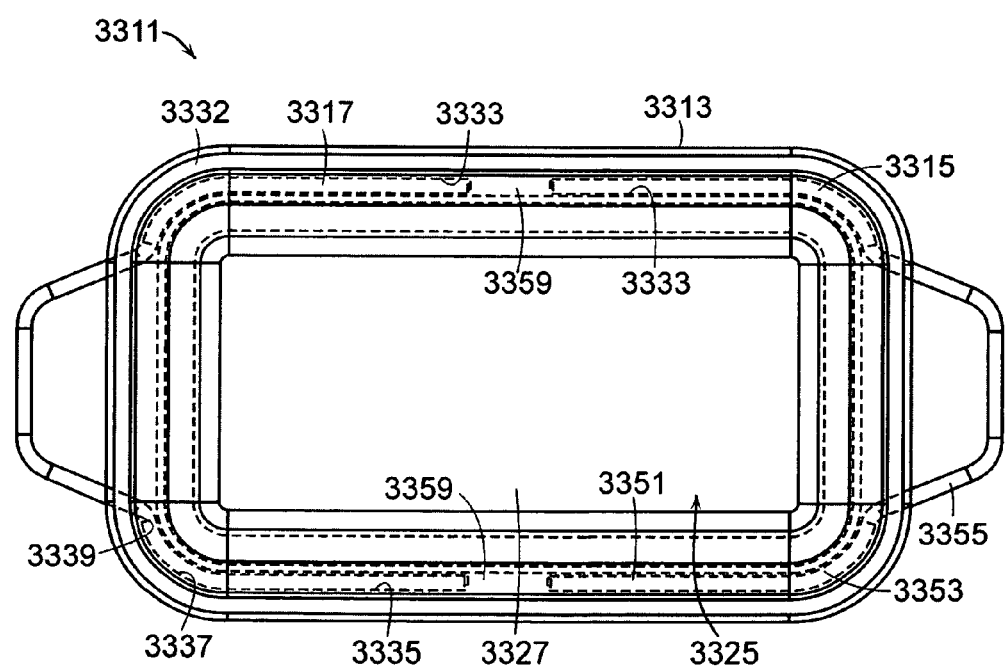
FIG. 34 illustrates a top view of the bakeware apparatus of FIG. 33.
Figure 35:
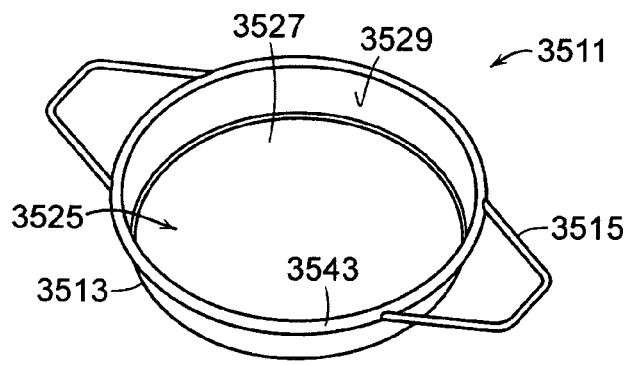
FIG. 35 depicts a perspective view of a bakeware apparatus having a flexible baking container and a carrier according to the principles of the present invention.
Figure 36:
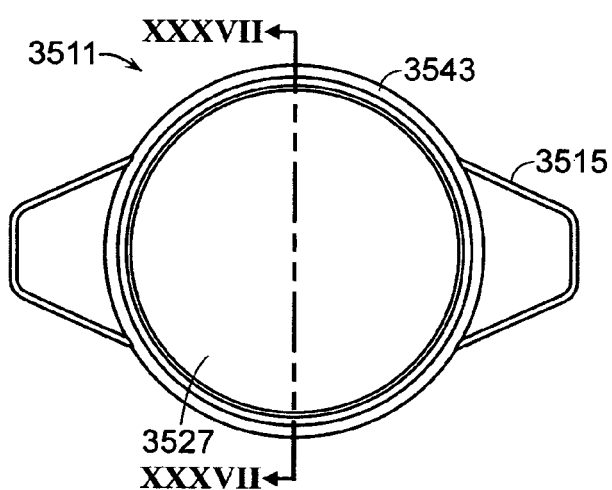
FIG. 36 illustrates a top view of the bakeware apparatus of FIG. 35.

Referring to FIGS. 33 and 34, a bakeware apparatus 3311 according to the principles of the present invention includes a flexible baking container 3313, a first carrier member 3315, and a second carrier member 3317. The carrier members 3315, 3317 act to provide some rigidity to the flexible baking container 3313, thereby allowing a user to more easily carry the flexible baking container 3313. By using more than one carrier member, the rigidity required to easily carry the flexible baking container 3313 is still provided; however, slightly more flexibility is provided by the use of two spaced-apart carrier members 3315, 3317, which allows the user to easily twist the flexible baking container 3313 to more easily remove food from the container.

Flexible baking container 3313 includes a basin 3325 having a floor 3327, a pair of minor walls 3329, and a pair of major walls 3331. Both the minor walls 3329 and the major walls 3331 are integrally connected to the floor 3327 such that each of the minor walls is spaced apart and each of the major walls is spaced apart. A shoulder 3332 is integrally connected to the minor walls 3329 and the major walls 3331 at an end of the walls 3329, 3331 opposite the floor. A receiving channel 3333 is provided in the shoulder 3332 similar to the receiving channel 131 in FIG. 11. The receiving channel 3333 is not necessarily continuous throughout the entire shoulder 3332 of each of the minor and major walls 3329, 3331. However, the receiving channel 3333 does preferably include a central portion 3335, a turning portion 3337, and an exit portion 3339. An entry slot (not shown) similar to entry slot 135 in FIG. 11 may or may not be provided. It will be apparent to a person having ordinary skill in the art that if an entry slot is provided the first carrier member 3315 and the second carrier member 3317 would be easily removable from the shoulder 3332. If an entry slot is not provided, it is more likely that the first and second carrier members 3315, 3317 would be co-molded with the flexible baking container 3313. It is also important to note that although flexible baking container 3313 includes a shoulder 3332, the shoulder may or may not be as pronounced as that shoulder 117 shown in FIG. 11. In fact, if the first and second carrier members 3315, 3317 were co-molded with the flexible baking container 3313, a shoulder may not be included at all. Instead, the minor walls 3329 and major walls 3331 of the flexible baking container 3313 may be tapered as the walls rise upward from the floor 3327, thereby allowing the first and second carrier members 3315, 3317 to easily fit within the walls 3329, 3331 without the need for a shoulder.

The first carrier member 3315 and the second carrier member 3317 each preferably include a central stay 3351, an arcuate stay 3353, and a handle 3355. When positioned within the receiving channel 3333 the central stay 3351 is disposed in the central portion 3335, the arcuate stay 3353 is disposed within the turning portion 3337, and a portion of the handle 3355 is disposed within the exit portion 3339. Another portion of the handle 3355 is not received by the receiving channel 3333, but rather extends away from the flexible baking container 3313 to provide an easy gripping surface for a user carrying the bakeware apparatus 3311.

When the first and second carrier members 3315, 3317 are installed in the flexible baking container 3313, a space 3359 is provided between the first and second carrier members 3315, 3317. Since the carrier members 3315, 3317 are not connected and are instead spaced apart, it is possible to twist the first carrier member 3315 relative to the second carrier member 3317, thereby slightly twisting the flexible baking container 3313. This twisting of the flexible baking container is very helpful because it allows a user to more easily remove food from the baking container. After baking a food product, the user can easily carry the bakeware apparatus 3311 because of the rigidity provided by the first and second carrier members 3315, 3317. Then the user can turn the flexible baking container 3313 upside down and gently twist the first carrier member 3315 relative to the second carrier member 3317. When the flexible baking container 3313 experiences this slight twisting motion, the food product will easily drop free from the flexible baking container 3313. The space 3359 that exists between the carrier members 3315, 3317 may or may not include a receiving channel 3333. Although some rigidity is lost due to the carrier members 3315, 3317 not being connected, the overall rigidity provided by the carrier members 3315, 3317 to the flexible baking container 3313 is enough that the carrier members 3315, 3317 still allow for easier carrying of the flexible baking container 3313.

Referring to FIGS. 35-38, a bakeware apparatus 3511 according to the principles of the present invention includes a flexible baking container 3513 and a carrier 3515 to be used with the flexible baking container 3513 to assist a user carrying the flexible baking container 3513. In the embodiment shown in FIGS. 35 and 36, the flexible baking container is a round baking pan having a basin 3525 formed from a floor 3527 integrally connected to a cylindrical wall 3529. The cylindrical wall 3529 includes an upper portion 3535 and a lower portion 3539. A shoulder 3543 is positioned around an upper portion 3535 of the cylindrical wall 3529 and includes a receiving channel 3545 positioned within the shoulder 3543. The receiving channel 3545 preferably includes an arcuate portion and an exit portion similar to the receiving channel 231 described earlier in reference to FIGS. 20 and 21.

Figure 37:
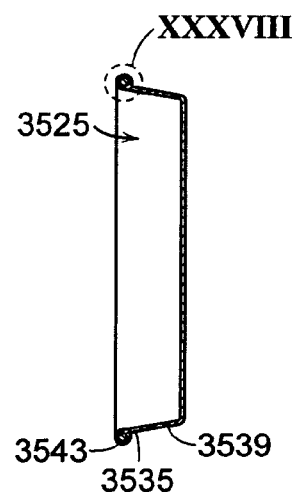
FIG. 37 depicts a cross-sectional side view of the bakeware apparatus of FIG. 36 taken at XXXVII-XXXVII.
Figure 38:
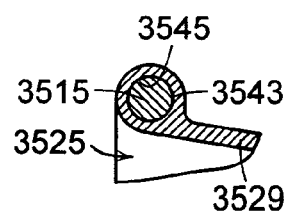
FIG. 38 illustrates an enlarged cross-sectional side view of the flexible baking container and carrier of FIG. 37 taken at Detail XXXVIII.

Referring more specifically to FIGS. 37 and 38, it will be noted that the carrier 3515 is co-molded into the receiving channel 3545 of the flexible baking container 3513. In this particular embodiment, the carrier 3515 would not be removable from the flexible baking container 3513. However, an entry slot similar to the entry slot 235 of FIG. 20 could be provided to allow removability of the carrier 3515 from the flexible baking container 3513. The carrier member 3515 includes a pair of stays and a pair of handles similar to the central stays 265 and handles 269 of FIG. 22.

Figure 39:
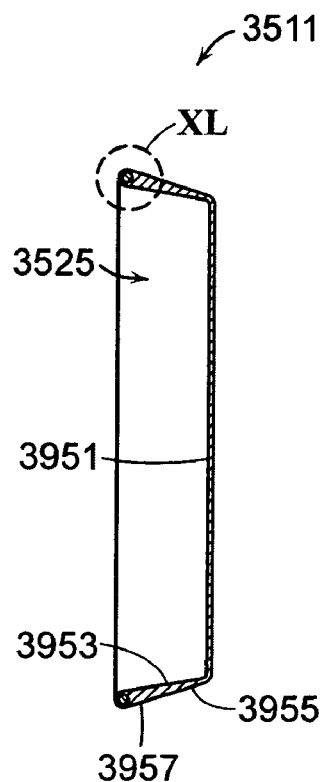
FIG. 39 depicts a cross-sectional side view of a bakeware apparatus having a flexible baking container and a carrier according the principles of the present invention, the view being similar to that of FIG. 37.
Figure 40:
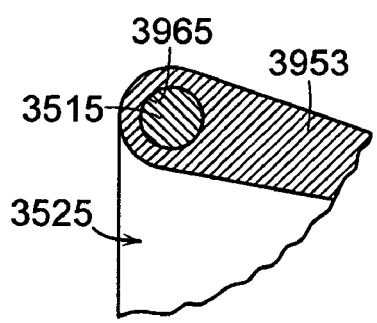
FIG. 40 illustrates an enlarged cross-sectional side view of the flexible baking container and carrier of FIG. 39 taken at Detail XL.
Figure 41:
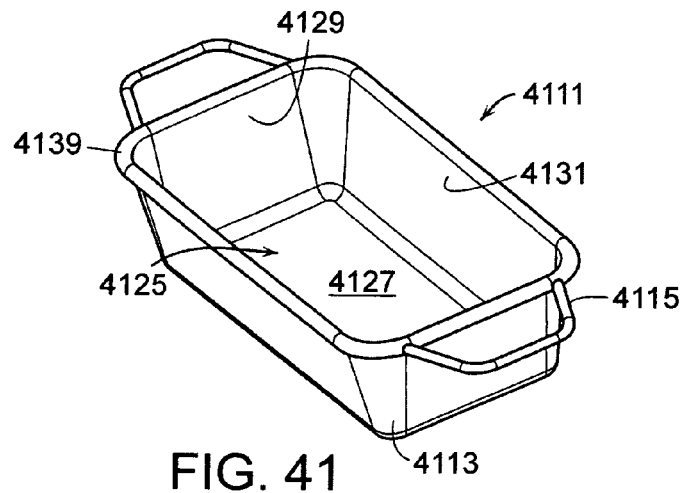
FIG. 41 depicts a perspective view of a bakeware apparatus having a flexible baking container and a carrier according to the principles of the present invention.
Figure 42:
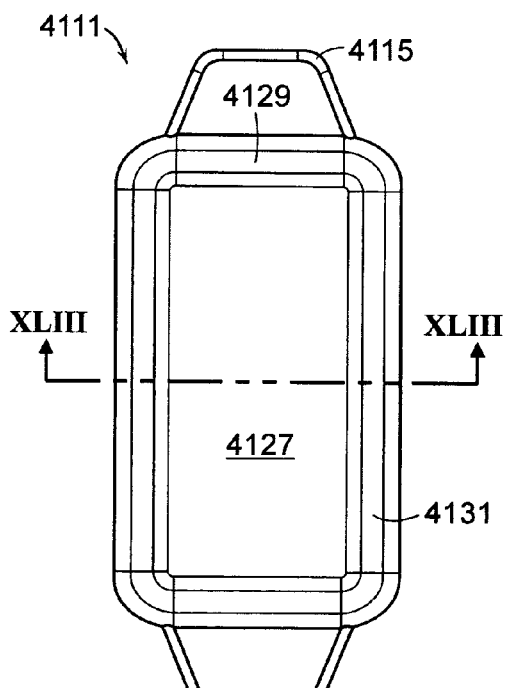
FIG. 42 illustrates a top view of the bakeware apparatus of FIG. 41.
Figure 43:
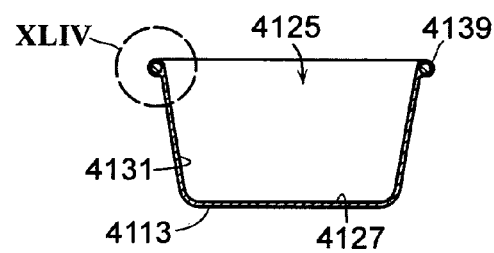
FIG. 43 depicts a cross-sectional front view of the bakeware apparatus of FIG. 42 taken at XLIII-XLIII.

Referring to FIGS. 39 and 40, an alternative configuration for flexible baking container 3513 is illustrated in which a basin 3525 includes a floor 3951 integrally connected to a cylindrical wall 3953. Cylindrical wall 3953 includes a lower portion 3955 that tapers upward and outward to an upper portion 3957. The upper portion 3957 of cylindrical wall 3953 is preferably thicker than the lower portion 3955 in order to eliminate the need for a shoulder. Again, a receiving channel 3965 is provided to receive the carrier 3515. In this particular instance the receiving channel 3965 is not disposed in a shoulder, but is rather positioned within the cylindrical wall 3953 itself. The carrier 3515 is preferably co-molded to the flexible baking container 3513. However, an entry slot could be provided to allow removability of the carrier 3515 from the receiving channel 3965.

Referring to FIGS. 41-44, a bakeware apparatus 4111 according to the principles of the present invention includes a flexible baking container 4113 and a carrier 4115 used in conjunction with the flexible baking container 4113 to allow a user to more easily carry the flexible baking container 4113. The flexible baking container 4113 is preferably a square or a rectangular baking pan and includes a basin 4125 having a floor 4127 integrally connected to a pair of minor walls 4129 and a pair of major walls 4131. The walls 4129, 4131 are configured such that each of the minor walls 4129 is spaced apart and each of the major walls 4131 is spaced apart.

Figure 44:
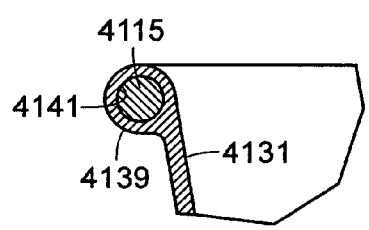
FIG. 44 illustrates an enlarged cross-sectional front view of the flexible baking container and carrier of FIG. 43 taken at Detail XLIV.

A shoulder 4139 is disposed around the major and minor walls 4129, 4131 at an end of the walls 4129, 4131 opposite the floor 4127. The shoulder includes a receiving channel 4141 for receiving carrier 4115. As illustrated in FIG. 44, the carrier 4115 may be co-molded with the flexible baking container 4113. Alternatively, an entry slot similar to entry slot 135 of FIG. 11 could be included in the shoulder 4139 to allow removal of the carrier 4115. The receiving channel 4141 preferably includes a central portion, a turning portion, and an exit portion similar to those described with reference to FIG. 12. Also, the carrier 4115 preferably includes a central stay, an arcuate stay, and a handle similar to those described with reference to FIG. 13.

Figure 45:
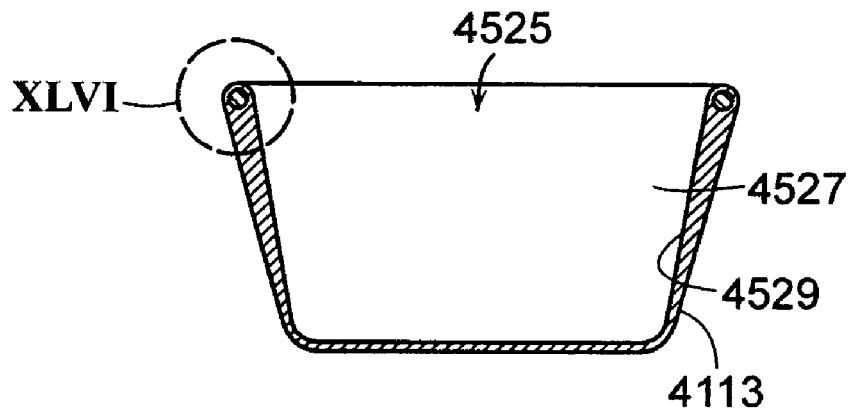
FIG. 45 depicts a cross-sectional front view of a bakeware apparatus having a flexible baking container and a carrier according the principles of the present invention, the view being similar to that of FIG. 43.
Figure 46:
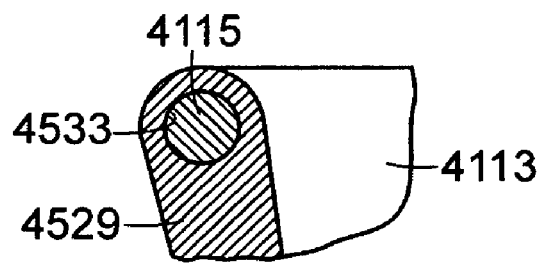
FIG. 46 illustrates an enlarged cross-sectional front view of the flexible baking container and carrier of FIG. 45 taken at Detail XLVI.
Figure 47:
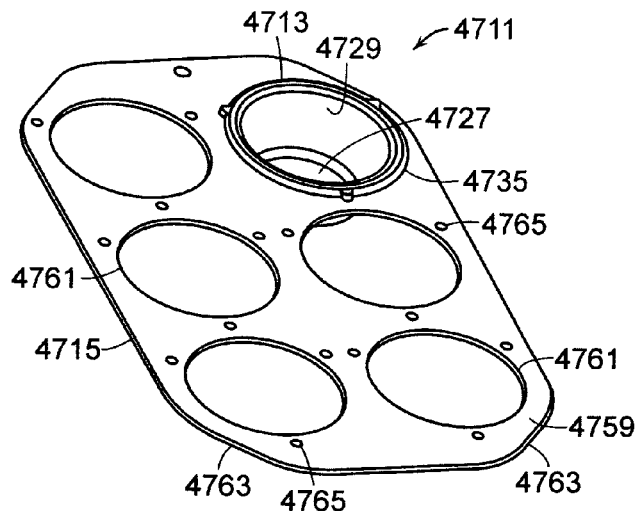
FIG. 47 depicts a perspective view of a bakeware apparatus having a flexible baking container and a carrier according to the principles of the present invention.

Referring to FIGS. 45 and 46, flexible baking container 4113 alternatively may include a basin 4525 having minor walls 4527 and major walls 4529. Instead of including a shoulder, the minor and major walls 4527, 4529 are preferably tapered such that an upper portion of the walls 4527, 4529 is thicker than a lower portion of the walls. A receiving channel 4533 is positioned within an upper portion of the walls 4527, 4529 to receive carrier 4115. Preferably the carrier 4115 is co-molded into the walls 4527, 4529 such that the carrier 4115 is not removable. Alternatively, an entry slot could be included to allow removability of the carrier 4115 from the walls 4527, 4529.

Referring to FIGS. 47-50, a bakeware apparatus 4711 according to the principles of the present invention includes a plurality of flexible baking containers 4713 and a carrier 4715 to support the flexible baking containers 4713, thereby allowing a user to more easily carry the flexible baking containers 4713. The flexible baking containers 4713 are preferably round muffin cups that can be used to bake muffins and other cylindrically shaped baked goods.

The flexible baking containers 4713 each include a basin 4725 having a floor 4727 integrally connected to a cylindrical wall 4729. A shoulder 4735 surrounds the cylindrical wall at an end of the wall 4729 opposite the floor 4727. A tab 4739 is preferably disposed on a lower surface of the shoulder 4735 to allow the flexible baking container 4713 to be securely fastened to the carrier 4715. Tab 4739 includes a main body 4743 and a barbed region 4745. The main body 4743 is preferably cylindrical, and the barbed region 4745 is greater in width (diameter) than the main body 4743.

Figure 50:
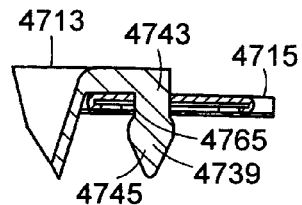
FIG. 50 illustrates an enlarged cross-sectional side view of the flexible baking container and carrier of FIG. 49 taken at Detail L.
Figure 49:
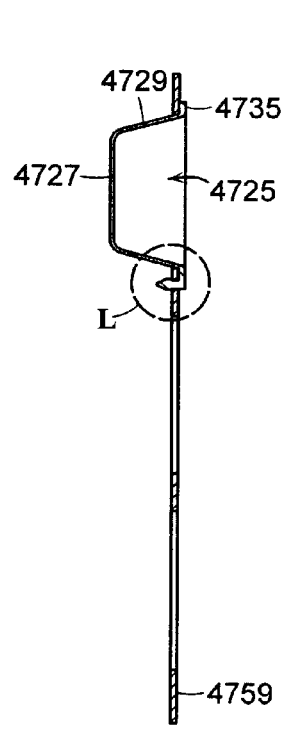
FIG. 49 depicts a cross-sectional side view of the bakeware apparatus of FIG. 48 taken at XLIX-XLIX.
Figure 48:
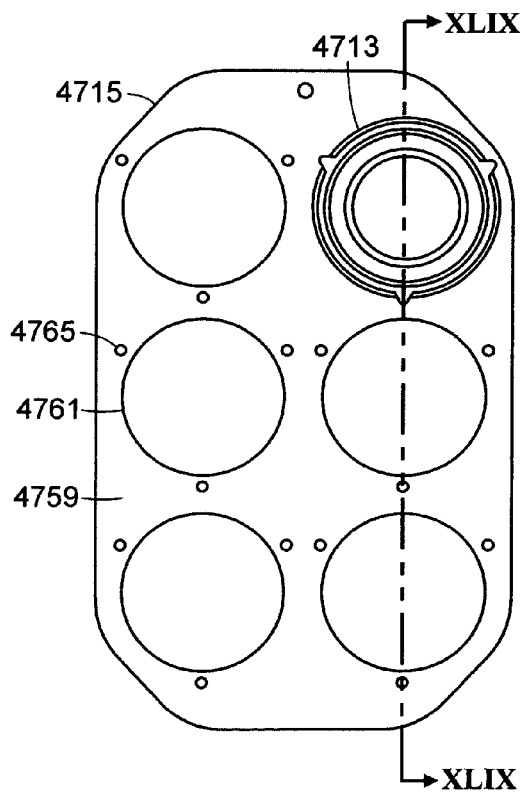
FIG. 48 illustrates a top view of the bakeware apparatus of FIG. 47.

The carrier 4715 is preferably formed from a substantially planar plate 4759 that includes a plurality of main apertures 4761 disposed in the plate 4759. The plate 4759 is generally rectangular in shape with chamfers 4763 at the four corners of the plate 4759. Of course, the shape of plate 4759 could be round, polygonal, or any other shape. Each main aperture 4761 is capable of receiving the basin 4725 of one of the flexible baking containers 4713. The plate 4759 has at least one attachment aperture 4765 (e.g. hole or slot) positioned adjacent each main aperture 4761. Preferably, at least three attachment apertures 4765 are positioned around each main aperture 4761, and the attachment apertures 4765 are equally spaced apart around the main apertures 4761 approximately 120° from one another. The attachment apertures 4765 on plate 4759 receive tabs 4739 on each flexible baking container 4713. Referring more specifically to FIG. 50, the barbed region 4745 of each tab 4739 is pulled through the attachment aperture 4765 such that the main body 4743 of the tab 4739 is positioned within the attachment aperture 4765 and the barbed region 4745 rests against a lower surface of the plate 4759. The barbed region 4745 prevents the tab 4739 from becoming easily dislodged from the attachment aperture 4765 and serves to lock the flexible baking container 4713 within the main aperture 4761.

It will be apparent to a person having ordinary skill in the art that while the preferred embodiment includes three tabs 4739 on each flexible baking container 4713 and three attachment apertures 4765 positioned around each aperture 4761, a different number of tabs and attachment apertures could be used to secure the flexible baking containers 4713 to the plate 4759. It should also be apparent that while the present embodiment is configured such that the tabs are positioned on the flexible baking container 4713 and the attachment apertures are positioned on the carrier 4715, tabs could be placed on the carrier 4715 to be received by holes disposed in each flexible baking container 4713.

The flexible bakeware (i.e. the muffin cups 41, 51, 2813, 4713, the rectangular baking containers 111, 171, 3313, 4113, and the round baking containers 211, 271, 3513) composition of the present invention is preferably made from an addition-cured silicone material. The following table illustrates the preferred amounts and potential ranges for the flexible bakeware composition of the present invention:

| Compound | Preferred Amount (Weight %) | Range (Weight %) |
| --- | --- | --- |
| Polydimethylvinylsiloxane/Silica | 60.88 | 40-70 |
| High Vinyl Silicone Gum | 1.1 | 0.5-10 |
| Ground Quartz (filler) | 28.5 | 5-50 |
| Polytetrafluoroethylene | 6.0 | 0.1-15 |
| Black Iron Oxide (pigment) | 1.1 | 0.1-5 |
| Zinc Stearate (internal mold release) | 0.14 | 0.1-5 |
| Silicon Hydride | 1.7 | 0.1-25 |
| Chloro Platanic Acid (cross-linking agent) | 0.57 | 0.1-5 |
| Ethynl Cyclohexanol (inhibitor) | 0.01 | 0.05-5 |

The flexible bakeware compound preferably contains 0.1 to 15 weight percent of polytetrafluoroethylene (PTFE). Testing of silicone bakeware with these amounts of PTFE has revealed superior release properties compared to silicone bakeware without PTFE. Several different compounds were tested by baking foods in the bakeware and then determining the amount of food residue remaining in the bakeware following the removal of the baked goods. Clearly, less food residue in the bakeware indicates better release properties. Silicone bakeware without PTFE required the use of a non-stick spray or flour to eliminate food residue following baking. Although silicone bakeware having PTFE ranging from 0.1 to 15 weight percent exhibited improved release properties without the use of a non-stick spray or flour, the optimum composition was determined to include six (6) weight percent PTFE.

The preferred particle size of PTFE used with the present invention is approximately 6 μm (i.e. microns), with a maximum particle size of 25 μm. While larger particle sizes of PTFE can also impart improved release properties to the bakeware, the plasticity of the resulting compound is sometimes increased to an extent that extrusion and molding of the compound is difficult or impossible. An example of PTFE commonly used in preparing the flexible bakeware compound of the present invention is Polymist F-5A, which can be obtained from Ausimont USA. Polymist F-5A contains particles of a relatively small size, typically at or below 6 μm.

The compounding of PTFE in the formulation of the present invention results in the migration of PTFE to the surface of the flexible bakeware. The presence of the PTFE at or near the surface at least partially results in the superior release properties of the bakeware. Another advantage provided by the PTFE is that it does not impart an odor or taste to food products baked in the bakeware.

The flexible bakeware compound is preferably combined with a cross-linking agent to insure that the bonds of the compound properly form. The cross linking agent may be a catalyst, such as platinum, or a curing agent such as peroxide. A platinum catalyst (i.e. chloro platanic acid) is preferably used in conjunction with silicon hydride to insure that the proper bonds form between the platinum and the silicone compound. If a curing agent, such as peroxide, were used, silicone hydride would not be required. However, peroxide is not preferred because it generally imparts an unpleasant odor and smell to foods baked in the bakeware. Other catalysts, including but not limited to cesium, palladium, rhodium, iron, cobalt, nickel, rubidium, osmium, or iridium, could be used in place of platinum. However, these substances are generally not favored because they are either more expensive (e.g. palladium) or have problems associated with contamination (e.g. iron).

The preferred filler for the bakeware compound is ground quartz in an amount of about 28.5 weight percent; however, filler in an amount of 5-50 weight percent could be used. Alternative fillers include silica, calcium, or any other mineral.

The bakeware compound preferably contains black iron oxide in an amount of 1.1 weight percent, which gives the finished bakeware a black color. Depending on the desired color for the bakeware, many different pigments could be used, and the amount of pigment used could also be varied to alter the color. Preferably, the weight range of the pigment is between 0.1 and 5 weight percent.

High vinyl silicone gum is preferably added to the compound in an amount of about 1.1 weight percent; however, the compound could include high vinyl silicone gum in any amount between about 0.5 and 10 weight percent. The vinyl component of high vinyl silicone gum is preferably 8-20 percent pendant vinyl with a preferred amount of 14 percent.

The novel composition of the present invention preferably has a specific gravity of about 1.12 to 1.64.

Each item of flexible bakeware is preferably injection, compression, or transfer molded. To further enhance the release properties of the bakeware, a molding tool having a finish between A1 and B2 is used to form the bakeware, with the preferred finish being A2. Molding finishes of this type are known standards within the molding industry.

It should be apparent that although the flexible bakeware of the present invention has been described in terms of a round muffin cup, a rectangular baking container, and a round baking container, any size or shape of flexible bakeware could be included within the scope of the present invention. Similarly, the carrier could be provided in many different shapes or sizes, and may include single or multiple handles that extend outward from the bakeware. Alternatively, the carrier may have no handles at all. The receiving channel shapes and sizes that are formed in each piece of flexible bakeware could also vary as long as the bakeware is securely attached to the carrier member and will not become disengaged from the carrier member while the bakeware is being transported or carried.

It is also important to note that while the flexible bakeware has been described as having an entry slot communicable with the receiving channel for allowing the carrier to be placed in the receiving channel, the entry slot could be omitted. Without an entry slot, the carrier would preferably be integrally molded into the shoulder of the bakeware. The carrier would not be removable, but the carrier would still be carried by a receiving channel that was formed around the carrier during the molding process.

The primary advantage provided by the carrier is that it allows a user of flexible bakeware to more easily lift and transport the bakeware while baking. By providing rigidity around the perimeter of the flexible bakeware, it is no longer necessary to support the flexible bakeware from underneath such as with a cooking sheet or tray. Another advantage is provided by the handle portions of the carrier. The handle portions extend outward from the perimeter of the flexible bakeware and provide a larger gripping surface for a user carrying the bakeware. When the carrier is provided in a multi-piece configuration similar to that shown in FIGS. 33 and 34, twisting of the carriers allows easier removal of food products. Still another advantage of the carrier system is that it is easily and inexpensively manufactured. Flexible bakeware can be easily manufactured with a receiving channel in a shoulder that surrounds the perimeter of the bakeware. The carrier can then be made to fit within the receiving channel to provide the needed rigidity to a portion of the bakeware.

The novel composition for flexible bakeware presented herein is preferably used in conjunction with a carrier to provide the added benefits of being able to more easily lift and carry the bakeware. However, the advantages provided by the novel composition are independent of those provided by the carrier. As a result of these independent, yet valuable, results, the novel composition may be used without the carrier in a manner similar to that of traditional flexible bakeware. It is also important to note that use of the composition described herein for flexible bakeware is not limited to use with bakeware having a particular size or shape.

The primary advantage provided by the bakeware composition of the present invention is that it enables improved release of food products being baked in the bakeware. The composition was obtained and refined by extensive testing and experimentation. Testing revealed that traditional flexible bakeware suffers food release problems unless pre-lubricated with either cooking spray, cooking oil, or flour. The addition of PTFE to an addition-cured silicone compound allows the manufacture of flexible bakeware that releases baked food without the need for pre-lubrication.

The composition described herein is not limited to flexible bakeware, but could be used with any product requiring the advantages presented by the compound. In addition to the "release" or "non-stick" advantage described previously, the compound provides excellent thermal insulating properties. The compound also has exceptional stability when exposed to cold and heat. The materials used with the compound are all food grade materials, so the product can be placed in contact with food. Finally, since the compound is silicone based, the compound provides excellent resistance to ultraviolet (UV) light. Some of the potential applications for the compound, outside of the flexible bakeware application, include but are not limited to spatulas and other cooking utensils, jello and confectionery molds, and ice cube trays. Other uses include cookware handles that are essentially insulative sleeves that slip over the hot handle of an item of cookware. The compound could be made into pot holders for removing hot items from an oven, or flat baking mats that can be placed on a cooking tray for baking cookies or other food products. Still another use could be sealing materials for appliance doors or windows, or any other sealing application where a flexible compound with good release properties is needed.

It should be apparent from the foregoing that an invention having significant advantages has been provided. While the invention is shown in only a few of its forms, it is not just limited but is susceptible to various changes and modifications without departing from the spirit thereof.

We claim:

1. A flexible baking container comprising:
   a basin having at least one wall and a floor at a first end of the wall;
   a shoulder surrounding at least a portion of the basin, the shoulder being attached to a second end of the wall opposite the floor;
   a receiving channel disposed within the shoulder;
   a first carrier member received by the receiving channel; and
   a second carrier member received by the receiving channel and being at least partially spaced apart from the first carrier member to form a space encompassed within the receiving channel and to allow movement of the second carrier member relative to the first carrier member;
   wherein the wall of the basin includes a pair of minor walls integrally connected to a pair of major walls such that each of the minor walls is spaced apart and each of the major walls is spaced apart;
   wherein the receiving channel includes a central portion, a turning portion, and an exit portion, the central portion being in the shoulder adjacent one of the major walls, the turning portion being in a corner portion of the shoulder, and the exit portion being in the shoulder adjacent one of the minor walls;
   wherein each carrier member includes a central stay, an arcuate stay, and a handle; and
   wherein the central stay is received by the central portion of the receiving channel, the arcuate stay is received by the turning portion of the receiving channel, and at least a portion of the handle is received by the exit portion of the receiving channel.

2. The flexible baking container according to claim 1 further comprising an entry slot communicable with the receiving channel to allow placement of the first and second carrier members within the receiving channel.

3. The flexible baking container according to claim 1, wherein the first and second carrier members are formed from a metal rod having a circular cross section.

4. The flexible baking container according to claim 1, wherein the first and second carrier members are integrally molded into the receiving channel.

5. The flexible baking container according to claim 1, wherein at least one of the basin and shoulder are made from a silicone elastomer.

6. The flexible baking container according to claim 1, wherein at least one of the basin and shoulder are made from a silicone elastomer further comprising:
   an addition-cured silicone polymer; and
   polytetrafluoroethylene in amount of about 0.1 to 15 weight percent.

7. The flexible baking container according to claim 1, wherein at least one of the basin and shoulder are made from a silicone elastomer further comprising:
   polydimethylvinylsiloxane of about 61 weight percent;
   a filler of about 28.5 weight percent;
   polytetrafluoroethylene of about 6 weight percent; and
   chloro platanic acid of about 0.57 weight percent.

8. The flexible baking container according to claim 1, wherein the first carrier member is separate from the second carrier member.

9. An elastomeric baking container comprising:
   a basin;
   a receiving channel disposed in an upper portion of the basin;
   a first carrier member at least partially disposed within the receiving channel;
   a second carrier member at least partially disposed within the receiving channel; and
   wherein each of the first and second carrier members includes ends encompassed by and terminating within the receiving channel such that the first carrier member is capable of rotational or twisting movement relative to the second carrier member;

wherein the basin includes four walls and a floor, and a shoulder is positioned around the four walls;

wherein the receiving channel is disposed within the shoulder;

wherein the ends of the first and second carrier members further comprise a first end and a second end of the first carrier member and a first end and a second end of the second carrier member;

wherein the first end of the first carrier member and the first end of the second carrier member terminate within a portion of the receiving channel associated with a first wall of the four walls;

wherein the second end of the first carrier member and the second end of the second carrier member terminate within a portion of the receiving channel associated with a second wall of the four walls; and wherein the first wall and the second wall are non-adjacent to one another.

10. The elastomeric baking container of claim 9, wherein at least a portion of the first carrier is coaxially aligned with at least a portion of the second carrier.

11. The elastomeric baking container of claim 9 further comprising a space positioned within the receiving channel between the ends of the first and second carrier members.

* * * * *